United States Patent
Wirth et al.

(10) Patent No.: US 11,348,724 B2
(45) Date of Patent: May 31, 2022

(54) PRIMARY-SIDED AND A SECONDARY-SIDED ARRANGEMENT OF WINDING STRUCTURES, A SYSTEM FOR INDUCTIVE POWER TRANSFER AND A METHOD FOR INDUCTIVELY SUPPLYING POWER TO A VEHICLE

(71) Applicant: Bombardier Primove GmbH, Berlin (DE)

(72) Inventors: Christian Wirth, Winterthur (CH); Robert Czainski, Doluje (PL); Rudolf Lindt, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 16/930,783

(22) Filed: Jul. 16, 2020

(65) Prior Publication Data
US 2020/0365317 A1    Nov. 19, 2020

Related U.S. Application Data

(62) Division of application No. 15/739,459, filed as application No. PCT/EP2016/064556 on Jun. 23, 2016, now Pat. No. 11,031,178.

(30) Foreign Application Priority Data

Jun. 26, 2015 (GB) .................................. 1511259
Jul. 14, 2015 (GB) .................................. 1512275
Apr. 22, 2016 (GB) .................................. 1607032

(51) Int. Cl.
*H01F 38/14* (2006.01)
*H01F 3/10* (2006.01)
(Continued)

(52) U.S. Cl.
CPC ............ *H01F 38/14* (2013.01); *B60L 53/126* (2019.02); *B60L 53/305* (2019.02); *H01F 3/10* (2013.01);
(Continued)

(58) Field of Classification Search
CPC . H01F 38/14; H01F 3/10; H01F 27/28; H01F 41/04; B60L 53/126; B60L 53/305;
(Continued)

(56) References Cited

U.S. PATENT DOCUMENTS 5,654,621 A     8/1997   Seelig
8,590,682 B2   11/2013   Meins et al.
(Continued)

FOREIGN PATENT DOCUMENTS

EP    3294586 A1   3/2018
GB    2485616 A    5/2012
(Continued)

*Primary Examiner* — Toan T Vu
*Assistant Examiner* — Thai H Tran
(74) *Attorney, Agent, or Firm* — The Webb Law Firm

(57) ABSTRACT

A primary-sided arrangement of primary winding structures of a system, wherein the primary-sided arrangement includes at least three phase lines and at least one winding structure per phase line, wherein each winding structure includes at least one subwinding structure, wherein the winding structures extend along a longitudinal axis of the primary-sided arrangement, wherein a pitch between corresponding subwinding structures of a first winding structure and a second winding structure is chosen from an interval of a length of one subwinding structure, and wherein a pitch between corresponding subwinding structures of the first winding structure and the third winding structure is smaller than the pitch between corresponding first and second subwinding structures.

13 Claims, 6 Drawing Sheets

(51) Int. Cl.
*B60L 53/126* (2019.01)
*B60L 53/30* (2019.01)
*H02J 50/10* (2016.01)
*H01F 27/28* (2006.01)
*H01F 41/04* (2006.01)

(52) U.S. Cl.
CPC .............. *H01F 27/28* (2013.01); *H02J 50/10* (2016.02); *H01F 41/04* (2013.01); *Y02T 10/70* (2013.01); *Y02T 10/7072* (2013.01); *Y02T 90/12* (2013.01); *Y02T 90/14* (2013.01)

(58) Field of Classification Search
CPC .......... B60L 53/12; B60L 53/30; H02J 50/10; Y02T 10/70; Y02T 10/7072; Y02T 90/14; Y02T 90/12; Y02T 90/16; B60Y 2200/91
See application file for complete search history.

(56) References Cited

U.S. PATENT DOCUMENTS

| | | | |
|---|---|---|---|
| 9,067,496 B2 | 6/2015 | Czainski et al. | |
| 9,745,703 B2 | 8/2017 | Curran et al. | |
| 9,806,540 B2 | 10/2017 | Anders et al. | |
| 2008/0129246 A1* | 6/2008 | Morita | B60L 5/005 320/108 |
| 2010/0072815 A1 | 3/2010 | Hahn et al. | |
| 2013/0229061 A1 | 9/2013 | Budhia et al. | |
| 2014/0253275 A1 | 9/2014 | Shijo et al. | |
| 2014/0361630 A1* | 12/2014 | Boys | H02J 50/10 307/104 |
| 2015/0081519 A1 | 3/2015 | Brereton et al. | |
| 2015/0170832 A1 | 6/2015 | Covic et al. | |
| 2016/0090275 A1 | 3/2016 | Piech et al. | |
| 2016/0301250 A1 | 10/2016 | Woronowicz et al. | |
| 2016/0308394 A1 | 10/2016 | Abdolkhani et al. | |
| 2016/0336818 A1 | 11/2016 | Garcia Briz et al. | |
| 2017/0080815 A1 | 3/2017 | Wechsler et al. | |

FOREIGN PATENT DOCUMENTS

| | | |
|---|---|---|
| GB | 2505516 A | 3/2014 |
| GB | 2512855 A | 10/2014 |
| GB | 2512864 A | 10/2014 |
| JP | H8502640 A | 3/1996 |
| JP | 2008120239 A | 5/2008 |
| JP | 2013534040 A | 8/2013 |
| JP | 2014197663 A | 10/2014 |
| WO | 2010000494 A1 | 1/2010 |
| WO | 2011145953 A1 | 11/2011 |
| WO | 2014011059 A1 | 1/2014 |
| WO | 2014122125 A1 | 8/2014 |
| WO | 2014166942 A2 | 10/2014 |
| WO | 2015072863 A1 | 5/2015 |
| WO | 2015075026 A1 | 5/2015 |
| WO | 2015128450 A1 | 9/2015 |
| WO | 2016182779 A1 | 11/2016 |

\* cited by examiner

State of the art

PRIMARY-SIDED AND A SECONDARY-SIDED ARRANGEMENT OF WINDING STRUCTURES, A SYSTEM FOR INDUCTIVE POWER TRANSFER AND A METHOD FOR INDUCTIVELY SUPPLYING POWER TO A VEHICLE

CROSS-REFERENCE TO RELATED APPLICATIONS

This application is a divisional application of U.S. application Ser. No. 15/739,459, filed on Dec. 22, 2017, which is the United States national phase of International Application No. PCT/EP2016/064556 filed Jun. 23, 2016, and claims priority to United Kingdom Patent Application Nos. 1511259.2, 1512275.7, and 1607032.8, filed Jun. 26, 2015, Jul. 14, 2015, and April 22, 2016, respectively, the disclosures of which are hereby incorporated in their entirety by reference.

BACKGROUND OF THE INVENTION

Field of the Invention

The invention relates to a primary-sided and a secondary-sided arrangement of winding structures of a system for inductive power transfer. Further, the invention relates to such a system for inductive power transfer and a method for inductively transferring power to a vehicle.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of winding structures. A first set is installed on the ground (primary winding structures) and can be fed by a wayside power converter (WPC). The second set of windings (secondary winding structures) is installed on the vehicle. For example, the second set of windings can be attached underneath the vehicle, in the case of trams under some of its wagons. For an automobile it can be attached to the vehicle chassis. The secondary winding structure(s) or, generally, the secondary side is often referred to as pick-up-arrangement or receiver or is a part thereof. The primary winding structure(s) and the secondary winding structure(s) form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

WO 2011/145953 A1 discloses a three-phase topology with three looped conductors. The conductors overlap each other such that a current phase differs by 60° in each adjacent conductor which creates a travelling field along the length of the track. The pitch of the track disclosed in WO 2011/145953 A1 is provided such that a pitch between successive loop sections of a first conductor providing a first phase line to a second conductor providing a second phase line is ⅔ of a length of one loop, wherein the pitch between corresponding loop sections of the first conductor and a third conductor providing a third phase line is ⅘ of the length. This results from the balanced mutual coupling between the phases which is stated as a feature of the three phase track topology disclosed in WO 2011/145953 A1. WO 2011/145953 is incorporated by reference herein in its entirety.

PCT/EP2014/074889 (application number, not yet disclosed) describes a method of operating a three phase primary winding structure and a primary unit. PCT/EP2014/074889 is incorporated by reference herein in its entirety.

There is the technical problem of providing a primary-sided and a secondary-sided arrangement of winding structures of a system for inductive power transfer, a system for inductive power transfer and a method of inductively transferring power to a vehicle, wherein an installation space is minimized.

The solution to said technical problem is provided by the subject-matter disclosed herein.

SUMMARY OF THE INVENTION

A primary-sided arrangement of primary winding structures of or for a system for inductive power transfer is proposed. The system can be a system for inductive power transfer to a vehicle. The primary-sided arrangement of primary winding structures can be part of a so-called inductive power transfer pad or charging pad. Such a pad can be installed on the surface of a route or a parking space or integrated within such a surface. The primary winding structure(s) generate an alternating (electro-) magnetic field if the primary winding structures are energized or supplied with operating currents. This electromagnetic field can be received by one or more secondary winding structure(s).

In the following, a primary winding structure can also be referred to as winding structure. The primary-sided arrangement comprises at least three phase lines and at least one winding structure per phase line. A winding structure can be provided by one or more conductor(s). The phase line can be provided by a winding structure or vice versa.

Each winding structure comprises at least one subwinding structure. A subwinding structure can be provided by at least one section of the winding structure. In particular, a subwinding structure can provide a loop or a coil, wherein the loop or coil is provided by at one or multiple section(s) of the winding structure.

The winding structures extend along a longitudinal axis of the primary-sided arrangement. Preferably, a winding structure comprises multiple subwinding structures which extend along the longitudinal axis of the primary-sided arrangement, which can be parallel to a longitudinal axis of one winding structure. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped. Of course, other geometrical shapes are also possible. The longitudinal axis of the primary-sided arrangement can e.g. be parallel to a desired direction of travel of a vehicle driving above the primary winding structure into a charging position.

Neighbouring or adjacent subwindings can be counter-oriented. This can mean that a current flow in a first subwinding is oriented clockwise, wherein the current flow in the neighbouring or adjacent second subwinding is counter-clockwise. The clockwise direction can be defined with respect to the parallel central axes which point into the same direction. If a current flows through the said subwindings, adjacent subwindings will generate a magnetic field of the same magnitude but oriented in opposite direction.

The winding structure can, in particular, be provided by flat subwinding structures, in particular flat loops or coils. This means that the winding structure is substantially arranged within a two-dimensional plane. Each subwinding structure can provide one pole of the respective phase line if the winding structure is energized with an alternating current.

The longitudinal axis of the primary-sided arrangement denotes an axis along which the at least one subwinding structure of each of the at least three winding structures extend. This means, that each of the at least three winding structures comprises at least one section which extends along said longitudinal axis. Corresponding subwinding structures of the at least three winding structures, for example the first subwinding structure of each winding structure, are arranged with a predetermined displacement from one another along said longitudinal axis. This displacement can be referred to as pitch between corresponding subwinding structures. The pitch can e.g. be the distance between geometric centres of the said corresponding subwinding structures along the longitudinal axis. Also, the pitch can e.g. be the distance between rear end active sections of the said subwinding structures along the longitudinal axis. Corresponding subwinding structures of each winding structure can denote the subwinding structures with the same position in the sequence of subwinding structures along the longitudinal axis, i.e. the first subwinding structure of each winding structure, the second subwinding structure of each winding structure and so on. The longitudinal axis can also be defined as an axis along which poles or pole pairs are located.

It is possible that a first winding structure, a second winding structure and at least a third winding structure each comprise at least one winding section which extends along the longitudinal axis and at least one winding section which extends along a lateral axis. The lateral axis can be oriented orthogonal to the longitudinal axis. The lateral and longitudinal axes can span the aforementioned plane in which the winding structure is substantially arranged. The longitudinal axis and the lateral axis can both be oriented perpendicular to a vertical axis, wherein the vertical axis can be oriented parallel to an axis of symmetry of a subwinding structure and oriented from the primary-sided arrangement towards a secondary-sided arrangement. The vertical axis can, in particular, be parallel to the main direction of power transfer. Directional terms referring to a direction such as "above", "under", "ahead", "beside" can relate to the aforementioned longitudinal, lateral and vertical axes.

The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal axis and two sections extending substantially or completely parallel to the lateral axis. The sections extending parallel to the lateral axis can also be referred to as active sections. An active section of a winding structure can comprises a section of only one subwinding structure which extends substantially or completely parallel to the lateral axis. Alternatively, an active section of a winding structure can comprises a section of a subwinding structure and a section of an adjacent subwinding structure, wherein the sections of both subwinding structures extend substantially or completely parallel to the lateral axis, wherein the section of the adjacent subwinding structures are arranged adjacent to one another.

Further, a pitch between corresponding subwinding structures of the first winding structure and a second winding structure is chosen from an interval of 0 (exclusive) to 1 (exclusive) of a length of one subwinding structure. The length is defined as the dimension of the subwinding structure, in particular the maximum dimension, along the longitudinal axis.

All subwinding structures of one winding structure or of all winding structures can have the same length or pole pitch. Alternatively, different subwinding structures of one winding structure can have different lengths or pole pitches. Also, corresponding subwinding structures of different winding structures can have different length or pole pitches.

The pitch between corresponding subwinding structures and the phase shift between the operating current can define the so-called pole pitch between adjacent pole pairs along the longitudinal axis of the primary-sided arrangement. The pole pitch can denote a distance between the centre of the operating current density of a first active section of a winding structure and the centre of the operating current density of a second active section of the winding structure, wherein the second active section of the winding structure denotes the next active section along the longitudinal axis. The pole pitch of one subwinding structure can be provided between two active sections which are at least partially or fully provided by sections of the subwinding structure.

In particular, the pole pitch can be equal or approximately equal to the length of one subwinding structure. It is also possible that the pole pitch is slightly higher than the length of the subwinding structure.

Under normal operating conditions, the first winding structure is energized or energizable by a first operating current wherein the second winding structure is energized or energizable by a second operating current. A third winding structure is energized or energizable by a third operating current. A phase shift between the first and the second operating current can be 120°, wherein a phase shift between a first and the third operating current can be 240°. A phase shift between the operating currents can also be adapted to the pitch between the respective winding structures, wherein a distance of two times the length of a subwinding structure can correspond to 360°.

According to the invention, a pitch between corresponding subwinding structures of the first winding structure and the third winding structure is smaller than the pitch between corresponding subwinding structures of the first winding structure and the second winding structure.

As a result, and in contrast to the disclosure of WO 2011/145953 A1, the third winding structure is set back along the longitudinal axis. This, however, results in a non-symmetrical mutual coupling between the different winding structures. As an advantage, less installation space is required for the primary-sided arrangement, in particular less installation space along the longitudinal axis.

Preferably, the pitch between corresponding subwinding structures of the first winding structure and the second winding structure is chosen from an interval of ⅓ (inclusive) to 1 (exclusive) of the length of one subwinding structure. A pitch between corresponding subwinding structures of the first winding structure and the third winding structure can then be chosen from an interval of 0 (exclusive) to ⅓ (inclusive) of the length of one subwinding structure.

Alternatively, pitches between corresponding subwinding structures of the first winding structure and the second winding structure can be chosen from an interval of 0 (exclusive) to 1 (exclusive) and the pitch between corresponding subwinding structures of the first winding structure and the third winding structure can also be chosen from an interval of 0 (exclusive) to 1 (exclusive) of the length of one subwinding structure.

In another embodiment, the pitch between corresponding subwinding structures of the first winding structure and the third winding structure is equal to the pitch between corresponding subwinding structures of the second winding structure and the third winding structure. In particular in the case that each winding structure comprises more than three subwinding structures, a homogeneous flux density distribution is provided above the primary winding structures. In this case, the pitch can e.g. be chosen as ⅙ or ⅓ of the length of one subwinding structure.

In a preferred embodiment, the pitch between corresponding subwinding structures of the first winding structure and the second winding structure is chosen as ⅔ of the length of one subwinding structure, wherein the pitch between corresponding subwinding structures of the first winding structure and the third winding structure is chosen as ⅓ of the length of one subwinding structure. In contrast to the arrangement disclosed in WO 2011/145953 A1, the third winding structure is set back along the longitudinal axis by the length of a subwinding structure. This advantageously reduces a building space requirement for the proposed arrangement.

In an alternative embodiment, the pitch between corresponding subwinding structures of the first winding structure and the second winding structure is chosen as ⅓ of the length of one subwinding structure, wherein the pitch between corresponding subwinding structures of the first winding structure and the third winding structure is chosen as ⅙ of the length of one subwinding structure. In contrast to the arrangement disclosed in WO 2011/145953 A1, the second and the third winding structure are set back along the longitudinal axis. This advantageously further reduces a building space requirement for the proposed arrangement.

In another embodiment, corresponding subwinding structures are designed and/or arranged such that directions of the magnetic fluxes generated by the first subwinding structure of the first and second winding structure are oriented in the same direction, wherein said direction is oriented opposite to the direction of the magnetic flux generated by the first subwinding structure of the third winding structure if either a positive or negative current is applied to or flows through the corresponding subwindings.

In particular, subwinding structures of the third winding structure can be arranged counter-oriented with respect to the corresponding subwinding structure of the first and the second winding structure. This can mean that a current flow in the first and second subwinding of the first winding structure is oriented clockwise, wherein the current flow current in the corresponding first subwinding of the third winding structure is oriented counter-clockwise if the current in all corresponding subwindings is either a positive or negative current.

The flow direction of a positive current can e.g. point from a feeding point of the respective winding structure to a star point by which all winding structures are connected. Also, the flow direction of a positive current can e.g. point from a feeding point of the respective winding structure to a connection point with a reference potential which is a common reference potential of all winding structures.

The feeding point can e.g. denote an electrical connection point of the winding structure. A feeding point can e.g. be provided by a connector. Alternatively, a winding structure can be wound with a feed line section, wherein an end of the feed line section provided the feeding point. The feeding point of a winding structure can e.g. be connected to a central point of a switching leg of an inverter by which the operating currents are provided to the winding structure. The central point can be a point of the connection between the two switching elements of the switching leg. The flow direction of a positive current can e.g. point from the central point to the feeding point.

The inverter can be part of the proposed arrangement. In particular, the inverter can comprise three switching legs, wherein each switching leg is provided by the serial connection of two switching elements. The feeding point of each winding structure is electrically connected to a central point of one of the switching legs.

This advantageously allows to provide a small ratio between the generated stray field and the generated power transfer field. Further, a position of a local maximum of the flux density can be adjusted to a desired position. This advantageously allows to adapt the generated power transfer field to different positions of a secondary winding structure relative to the primary winding structure. Thus, the magnetic coupling between the primary winding structures and the secondary winding structure can be maximized while the magnetic coupling between the primary winding structures and other structures, e.g . a vehicle chassis, can be minimized.

As an alternative to said design and/or arrangement, corresponding subwinding structures can be designed and/or arranged such that a direction of the magnetic flux generated by the first subwinding structure of the first and second winding structure is equal to the direction of the magnetic flux generated by the first subwinding structure of the third winding structure if either a positive or negative current flows through the corresponding subwindings. If such a design and/or arrangement of the subwinding structure is provided, the phase angle of an operating current for the third winding structure can be shifted or adjusted by −180° or +180°. This means that if a positive current is applied to or flows through the subwinding structures of the first and the second winding structure, a negative current is applied to or flows through the subwinding structure of the third winding structure. Further, if a negative current is applied to or flows through the subwinding structures of the first and the second winding structure, a positive current is applied to or flows through the subwinding structure of the third winding structure.

As a result, directions of the magnetic fluxes generated by the first subwinding structure of the first and second winding structure are oriented in the same direction, wherein said direction is oriented opposite to the direction of the magnetic flux generated by the first subwinding structure of the third winding structure.

In another embodiment, at least one feeding point of the first subwinding structure of the first winding structure and at least one feeding point of the first subwinding structure of the second winding structure are arranged on a first lateral side of the arrangement, wherein at least one feeding point of the first subwinding structure of the third winding structure is arranged on a second lateral side of the arrangement. This advantageously provides a simple mechanical design for providing the counter-oriented corresponding subwindings of the winding structures.

Within the proposed arrangement, corresponding subwinding structures of the first winding structure and/or the second winding structure and/or the third winding structure can overlap each other at least partially. In this case, each winding structure can be arranged in a plane, wherein the planes are arranged at different vertical positions along the vertical axis. This advantageously further reduces the installation space requirements.

In a preferred embodiment, a length or pole pitch of the subwinding structures of one winding structure varies, in particular along the longitudinal axis. This means that the length of at least one subwinding structure of one winding structure is different from, e.g. longer or shorter than, the length of at least one of the remaining subwinding structures of said winding structure.

Alternatively, the pole pitch provided by at least one subwinding structure of one winding structure can be different, e.g. longer or shorter, from the pole pitch provided by at least one of the remaining subwinding structures of said winding structure.

The longest length or longest pole pitch can be 1.05 to 1.3 times longer than the shortest length or pole pitch of/provided by a subwinding structure of one winding structure.

In another embodiment, each subwinding structure of one winding structure can either have a first or a second length, wherein the second length is longer than the first length. The first length can also be referred to as short length, wherein the second length can also be referred to as long length. Alternatively or in addition, each subwinding structure of one winding structure can either provide a first or a second pole pitch, wherein the second pole pitch is longer than the first pole pitch. The first pole pitch can also be referred to as short pole pitch, wherein the second pole pitch can also be referred to as long pole pitch.

This means that the length or pole pitch of/provided by a subwinding structure of one winding structure is selected from a set of two different values.

It is, for instance possible, that the each of the winding structures comprises three subwinding structures. In this case, each winding structure can comprise two winding structures which have the first length or provide a first pole pitch and a remaining winding structure which has a second length or provides a second pole pitch.

The first and the second length or pole pitch can be winding structure-specific. It is possible that first length or first pole pitch of the subwinding structures of the first winding structure is equal to or different from the first length or first pole pitch of the subwinding structures of one or both remaining winding structure/s. It is also possible that second length or second pole pitch of the subwinding structures of the first winding structure is equal to or different from the second length or second pole pitch of the subwinding structures of one or both remaining winding structure/s.

Preferably, the first length of/pole pitch provided by the subwinding structures of the first winding structure is equal to the first length of/pole pitch provided by the subwinding structures of the second winding structure and the second length of/pole pitch provided by the subwinding structures of the first winding structure is equal to the second length of/pole pitch provided by the subwinding structures of the second winding structure. Further, the first length of/pole pitch provided by the subwinding structures of the first winding structure is smaller than the first length of/pole pitch provided by the subwinding structures of the third winding structure and the second length of/pole pitch provided by the subwinding structures of the first winding structure is smaller than the second length of/pole pitch provided by the subwinding structures of the third winding structure. In particular, the second length of/pole pitch provided by the subwinding structures of the first winding structure can be equal to the first length of/pole pitch provided by the subwinding structures of the third winding structure.

In another embodiment, a length distribution of the subwinding structures of the first winding structure along the longitudinal axis is inverse to a length distribution of the subwinding structures of the second winding structure along the longitudinal axis.

It is, for instance possible that the first and the second subwinding structure of the first winding structure have/provide a first length/pole pitch, wherein the third subwinding structure has/provides a second length. Further, the first subwinding structure of the second winding structure can have/provide a second length/pole pitch, wherein the second and the third subwinding structure of the second winding structure have/provide a first length/pole pitch. In this case, the first and the third subwinding structure of the third winding structure have/provide a first length/pole pitch, wherein the second subwinding structure of the third winding structure can have/provide a second length/pole pitch.

By varying the length of the subwinding structure, in particular according to the described embodiments, a higher homogeneity above the complete primary winding structure can be provided or achieved.

In another embodiment, the primary-sided arrangement comprises at least one magnetically conducting element or an arrangement of multiple magnetically conducting elements. The magnetically conducting element can also be referred to as flux guiding element. The flux guiding element is used to guide a magnetic flux of the electromagnetic field which is generated by the primary-sided arrangement. The magnetically conducting element can e.g. be a ferrite element or can comprise one or multiple ferrite element(s).

The at least one magnetically conducting element or the arrangement of multiple magnetically conducting elements can be arranged fully or partially under the winding structures. Alternatively or in addition, the at least one magnetically conducting element or one element of the arrangement of multiple elements can be arranged at least partially or fully within the plane in which one winding structure is arranged. In particular, the at least one magnetically conducting element can be arranged within or can extend into a volume or area enclosed by one subwinding structure.

The at least one magnetically conducting element or the arrangement of multiple elements can extend along the longitudinal axis. In particular, the at least one magnetically conducting element can be a strip-like or elongated element. In other words, the at least one magnetically conducting element can be a bar element, e.g. a ferrite bar. This advantageously allows decreasing the magnetic flux extending away from the primary-sided arrangement in an unwanted direction.

A bar element can have a constant height along its length. In this case, the bar element can have a cuboid shape. Alternatively, a bar element can have a varying height along its length. In particular, a bar element can have at least one section with a constant height and at least one section with an increasing height. The height can be measured along the vertical axis of the primary winding structure.

In another embodiment, the arrangement of magnetically conducting elements comprises multiple bar elements. These bar elements can be arranged such that the bar elements extend along the longitudinal axis. Multiple bar elements can be arranged along or parallel to a straight line parallel to the longitudinal axis, wherein these multiple bar elements can abut or overlap at front end or rear sections of the bar elements. Such an arrangement can also be referred to as row of bar elements.

It is possible that the arrangement of multiple bar elements comprises multiple rows, wherein each row comprises one or multiple bar elements.

In another embodiment, the arrangement of magnetically conducting elements comprises multiple rows of at least one magnetically conductive element, wherein a non-zero gap between two adjacent or successive rows is provided along the lateral direction. Each row comprises one or multiple bar elements extending along a line parallel to the longitudinal axis. The rows are spaced apart from another along or parallel to the lateral axis. The distance between two adjacent rows can be chosen from an interval of 0 mm (exclusive) to 50 mm (inclusive), preferably to 30 mm (inclusive). The non-zero gap advantageously allows to adjust or to provide a desired flux density within the volume or area enclosed by the subwinding structure.

In another embodiment, at least two magnetically conductive elements overlap each other. In particular, the at least two bar elements can overlap each other at a front end or rear end section of the bar elements. More particular, two successive bar elements of one row of multiple bar elements can overlap. This can mean that the at least two bar elements are arranged at different vertical positions along the aforementioned vertical axis. Overlapping bar elements or sections thereof can mechanically contact each other.

In another embodiment, the least one magnetically conducting element or an arrangement of magnetically conducting elements provides a recess to receive at least a section of the winding structure, in particular a subwinding structure. In particular, the recess can be arranged and/or designed in order to receive a section of a winding structure extending along or parallel to the lateral axis. More particular, the recess can be designed and/or arranged such that a section of a winding structure at the transition from one subwinding structure to the successive subwinding structure along the longitudinal axis can be arranged within the recess.

If an arrangement of multiple magnetically conductive elements comprises one or multiple rows of more than one magnetically conductive element, the magnetically conductive elements of one row can be arranged such that a recess is provided. The recess can e.g. be provided if only end sections of a second magnetically conductive element in the row, in particular an elongated element, overlap end sections of a first and a third magnetically conductive element in the row, respectively. The recess can then be provided between the first and the third magnetically conductive element. The width of the recess can be adapted to the width of the section of the primary winding structure to be received. In other words, magnetically conducting elements of an arrangement of multiple magnetically conductive elements can be arranged in a row. In this case, multiple magnetically conductive elements can be arranged successively along the longitudinal axis of the primary winding structure. Further, at least two successive magnetically conductive elements are aligned with a vertical offset to one another. This can mean that a non-zero distance between the longitudinal axes of two successive magnetically conductive elements is provided along or against the vertical axis of the primary winding structure. Further, there can be no vertical offset between every second magnetically conductive element of the row. The vertical offset can provide the recess. This advantageously further reduces an installation space requirement.

In another embodiment, at least one section of at least one magnetically conductive element extends into one subwinding structure. This can mean that the at least one section extends into or through a volume or area enclosed by the subwinding structure. This advantageously further reduces an installation space requirement.

In other words, at least one section of at least one magnetically conductive element can be arranged within the volume or area enclosed by a subwinding structure. A height of a magnetically conductive element which is arranged within the volume enclosed by a subwinding structure can be larger than, equal to or smaller than the height of the subwinding structure. This advantageously further reduces an installation space requirement. Further, the arrangement of a magnetically conductive element within the volume advantageously increases the amount of field lines of the alternating electromagnetic field which extend through said volume as the magnetically conductive element serves as a field collector.

It is possible that 30% to 70%, preferably 45% to 55%, of the volume enclosed by the subwinding structure is filled with one or multiple magnetically conductive elements.

If an arrangement of multiple magnetically conductive elements comprises one or multiple rows of more than one magnetically conductive element, the magnetically conductive elements of one row can be arranged such that at least one section of the winding structure is arranged within the recess provided by the row, wherein a section of the row is arranged within the volume or area enclosed by a subwinding structure.

It is, for instance, possible that one row comprises upper magnetically conductive elements and at least one or multiple lower magnetically conductive element/s, wherein the upper magnetically conductive elements are arranged within a volume or area enclosed by subwinding structures, wherein an lower magnetically conductive element bridges the section of the winding structure between the volumes of two adjacent subwinding structures. In this case, a first end section of the lower magnetically conductive element can overlap an end section of a first upper magnetically conductive element, wherein another end section of the lower magnetically conductive element overlaps an end section of a second upper magnetically conductive element. The recess is provided between the upper magnetically conductive elements. A lower magnetically conductive element can be arranged with an offset against the vertical direction with respect to an upper magnetically conductive element. In other words, a lower magnetically conductive element can be arranged at a lower vertical position than the upper magnetically conductive element, i.e. under the upper magnetically conductive element.

In a cross section, this arrangement of magnetically conductive elements in the row provides a hat-like structure.

In another embodiment, magnetically conducting elements of an arrangement of multiple magnetically conductive elements are arranged in a row. In this case, multiple magnetically conductive elements can be arranged successively along the longitudinal axis of the primary winding structure. Further, at least two successive magnetically conductive elements are aligned with a lateral offset to one another. This can mean that a non-zero distance between the longitudinal axes of two successive magnetically conductive elements is provided along the lateral axis of the primary winding structure. The lateral offset can be provided along or against the lateral axis of the primary winding structure. Further, there can be no lateral offset between every second magnetically conductive element of the row.

The arrangement of can comprises multiple rows, wherein a lateral offset between two successive magnetically conductive elements is only provided in selected but not in all rows. This means that the arrangement comprises one or more rows in which multiple magnetically conductive elements are arranged along the longitudinal axis of the primary winding structure with no lateral offset and one or more rows in which at least two successive magnetically conductive elements are arranged along the longitudinal axis with the said lateral offset.

It is, of course, possible that in addition to a lateral offset, a vertical offset is provided between two successive magnetically conductive elements of one row.

By providing the lateral offset, it is possible to vary, e.g. increase, the gap between two adjacent rows along the lateral direction. This allows to arrange other components between the two adjacent rows, e.g. fixation means.

In another embodiment, the primary-sided arrangement comprises at least one cable bearing element. The cable bearing element can denote an element adapted to position and/or to hold at least one winding structure or a part thereof, preferably all winding structures. In particular, the cable bearing element can be adapted to position and/or to hold a plurality of line sections of one or more electric lines which can provide the phase line(s) of the primary-sided arrangement.

The cable bearing element can comprises recesses forming spaces and/or projections delimiting spaces for receiving at least a section of a winding structure. A section of a winding structure can be provided by a section of a line or of a conductor. The winding structure can extend through these spaces.

Further, the cable bearing element can be adapted to position and/or to hold at least one magnetically conductive element, preferably the magnetically conductive element(s) which is/are arranged within the volume enclosed by the subwinding structures. The cable bearing element can be provided by a casting. Preferably, the cable bearing element is provided by a magnetically non-conductive material, e.g. plastic.

The cable bearing element can be formed as a shaped block which is described e.g. in GB 2485616 A or in GB 2505516 A. Therefore, the disclosure of GB 2485616 A and GB 2505516 A1, in particular the claimed embodiments, is/are incorporated into the present description by reference. Preferably, at least one end section of the cable bearing element can have a tapered or frustum shape. The cable bearing element can be arranged within a housing, in particular within an inner volume of the housing of an IPT pad. The cable bearing element can be made of a magnetically non-conductive material, e.g. plastic or concrete or polymer.

In another embodiment, a position of the primary-sided arrangement is adjustable at least along the vertical direction. It is, for instance, possible that the primary-sided arrangement is part of a primary unit, wherein the primary unit comprises a stationary part and a movable part. The movable part can comprise the primary-sided arrangement. Alternatively, the primary sided-arrangement can be attached to the movable part. Further, the movable part can be movable between a retracted state and an extended state.

The primary-sided arrangement can be part of a primary unit. The primary unit can e.g. comprise an inductive power transfer pad or be provided by such a transfer pad. Corresponding power transfer pad is disclosed in GB 1403547.1 (application number, not yet published). Thus, the disclosure of GB 1403547.1, in particular the claimed embodiments, are fully incorporated by reference into this disclosure.

The primary unit can further comprise an inverter. The inverter can be arranged within a housing of the primary unit. An input side of the inverter can be electrically coupled to a connecting terminal of the primary unit, wherein an output side of the inverter can be electrically coupled to the winding structures of the primary-sided arrangement. Further, the primary unit can comprise a rectifier, wherein the inverter can be coupled to the connecting terminal via the rectifier. The connecting terminal of the primary unit can be connectable or connected to an AC current generator. Further, the primary unit can comprise another connecting terminal, wherein the inverter can be coupled directly to the other connecting terminal. The other connecting terminal of the primary unit can be connectable or connected to a DC current generator, wherein a desired voltage is generable by the DC generator.

Further, the primary unit can comprise a control unit for controlling an operation of the inverter. Further, the primary unit can comprise a vehicle detection system. The vehicle detection system can comprise a RFID unit.

Further, the primary unit can comprise a compensating unit for compensating a self-inductance of the primary winding structures. Further, the primary unit can comprise foreign object detection system. Further, the foreign object detection system can be a metal object detection system. Alternatively or in addition, the object detection system can be a moving object detection system. Further, the primary unit can comprise a human machine interface and/or a signal transmitting or receiving means.

Such a primary unit is e.g. disclosed in WO 2014/166942 A2. Thus, the disclosure of WO 2014/166942 A2, in particular the claimed embodiments, is fully incorporated by reference into this disclosure.

The primary winding structures can further be operated or energized by a wayside power converter (WPC). Such a wayside power converter is e.g. disclosed in WO 2010/000494 A1. Thus, the disclosure of WO 2010/000494 A1, is fully incorporated by reference into this disclosure. The WPC can be provided by the aforementioned inverter.

Further proposed is a system for inductive power transfer, wherein the system comprises a primary-sided arrangement of primary winding structures according to one of the embodiments described in this invention. Further, the system comprises a secondary-sided arrangement of at least one secondary winding structure, wherein the secondary arrangement comprises at least one phase line and one winding structure per phase line.

The secondary winding structure(s) can be designed similar to the primary winding structure(s). The winding structure of the secondary arrangement can e.g. comprise one, two or more than two subwinding structure(s). At least one subwinding can provide a loop or a coil. The subwinding can be provided by at least one section of the winding structure. Also, the subwinding can provide or form a coil or a loop, e.g. with a predetermined number of turns, wherein the loop or coil is provided by at one or multiple section(s) of the winding structure.

A winding structure can be provided by one or more conductor(s). The phase line can be provided by a winding structure or vice versa.

The secondary winding structure extends along a longitudinal axis of the secondary-sided arrangement. Preferably, the secondary winding structure comprises two or more than two subwinding structures which extend along the longitudinal axis of the secondary-sided arrangement, which can be parallel to a longitudinal axis of one winding structure. In this case, successive subwinding structures of the winding structure can be arranged adjacent to one another along said longitudinal axis. A loop or coil can be circular-shaped, oval-shaped or rectangular-shaped. Of course, other geometrical shapes are also possible.

The winding structure can, in particular, be provided by flat subwinding structures, in particular flat loops or coils. This means that the secondary winding structure is substantially arranged within a two-dimensional plane spanned by the secondary-sided longitudinal and lateral axes. Each subwinding structure can provide one pole of the respective phase line if the winding structure is energized with an alternating current.

The longitudinal axis of the secondary-sided arrangement denotes an axis along which the at least one subwinding structure of the at least one secondary winding structures extends. This means, that the secondary winding structures comprises at least one section which extends along said longitudinal axis.

The winding structure of the secondary-sided arrangement can have an even or uneven number of subwindings which are arranged adjacent to each other along the secondary-sided longitudinal axis. This secondary-sided longitudinal axis can e.g. be parallel to a roll axis of the vehicle.

In an aligned state of the primary-sided arrangement and the secondary-sided arrangement, the longitudinal axis of the primary-sided arrangement and the longitudinal axis of the secondary-sided arrangement can be parallel. Further, the at least one winding structure of the secondary-sided arrangement can comprise at least one winding section which extends along a secondary-sided lateral axis which is oriented perpendicular to the secondary-sided longitudinal axis. In the aligned state, the primary-sided lateral axis and the secondary-sided lateral axis can also be oriented parallel. The secondary-sided lateral axis can be oriented parallel to a pitch axis of the vehicle.

Preferably, the secondary winding structure comprises two adjacent or successive subwindings. Also, neighbouring or adjacent subwindings can be counter-oriented.

The secondary-sided arrangement can be part of a secondary unit or receiving unit which can also be referred to as pick-up. The secondary unit can further comprise a rectifier, at least one compensating capacitance, means for supervising a temperature of the secondary unit, at least one control unit, e.g. a micro controller, and/or at least one communication means. The at least one communication means can be used for exchanging or transmitting data with a corresponding primary unit, e.g. via WLAN or Bluetooth™ or any other wireless communication.

The system can e.g. be designed such that an electric power of 3.6 kW can be transferred to a vehicle. The vehicle can, in particular, be an automobile.

The winding structure of the secondary-sided arrangement can provide at least one, two or even more poles. Preferably, the secondary-sided arrangement comprises exactly one secondary winding structure. The longitudinal axis of the secondary-sided arrangement can be oriented parallel to a direction of travel of the vehicle if the vehicle drives straight forward.

In another embodiment, the secondary-sided arrangement comprises at least one magnetically conducting element or an arrangement of magnetically conducting elements.

The at least one magnetically conducting element or the arrangement of magnetically conducting elements can be designed and/or arranged in a similar manner as the at least one magnetically conducting element or arrangement of magnetically conducting elements of the primary-sided arrangement. Thus, all details or aspects related to the primary-sided magnetically conducting element or arrangement of magnetically conducting elements apply to the arrangement of the secondary-sided arrangement in the same manner. A reference coordinate system for the secondary-sided arrangement is provided by the aforementioned secondary-sided longitudinal and lateral axes. A vertical axis of this reference coordinate system is oriented orthogonal to said longitudinal and lateral axis. The vertical axis of the reference coordinate system of the secondary-sided arrangement can be oriented in the same direction as the vertical axis of the reference coordinate system of the primary-sided arrangement. In contrast to the arrangement of the at least one magnetically conducting element or the arrangement of multiple arrangements of the primary-sided arrangement, however, the at least one magnetically conducting element or the arrangement of multiple magnetically conducting elements of the secondary-sided arrangement can be arranged fully or partially above the winding structure.

This advantageously increases the magnetic coupling between the primary and the secondary winding structures.

In another embodiment, the at least one magnetically conducting element or the arrangement of magnetically conducting elements of the secondary-sided arrangement is designed such that in an aligned state of the primary-sided and the secondary-sided arrangement, the at least one magnetically conducting element of the secondary-sided arrangement extends into or parallel to the primary-sided longitudinal axis.

In particular, rows of magnetically conductive element(s) of the secondary-sided and of the primary-sided arrangement can be arranged opposite to each other with reference to the vertical axis in the aligned state.

Further proposed is a secondary-sided arrangement of at least one secondary winding structure, wherein the secondary arrangement comprises at least one phase line and one winding structure per phase line. The secondary-sided arrangement can be designed according to one of the embodiments of the secondary-sided arrangement of the proposed system for inductive power transfer. In particular, the features or aspects of the secondary-sided arrangement of the system for inductive power transfer can be features and aspects of the proposed secondary-sided arrangement. The secondary-sided arrangement thus constitutes and independent invention.

Further, the secondary-sided arrangement comprises at least one magnetically conducting element or an arrangement of magnetically conducting elements. The magnetically conducting element can also be referred to as flux guiding element. The flux guiding element is used to guide a magnetic flux of the electromagnetic field which is generated by the primary-sided arrangement. The magnetically conducting element can e.g. be a ferrite element or can comprise one or multiple ferrite element(s).

The at least one magnetically conducting element can be arranged above the secondary winding structure. Alternatively or in addition, the at least one magnetically conducting element or one element of the arrangement of multiple elements can be arranged at least partially or fully within the plane in which one winding structure is arranged. In particular, the at least one magnetically conducting element can be arranged within or can extend into or through a volume or area enclosed by one subwinding structure of the secondary winding structure.

The at least one magnetically conducting element or the arrangement of multiple elements can extend along the longitudinal axis. In particular, the at least one magnetically conducting element can be a strip-like or elongated element. In other words, the at least one magnetically conducting element can be a bar element, e.g. a ferrite bar. This advantageously allows decreasing the magnetic flux extending away from the secondary-sided arrangement in an unwanted direction.

A bar element can have a constant height along its length. In this case, the bar element can have a cuboid shape. Alternatively, a bar element can have a varying height along its length. In particular, a bar element can have at least one section with a constant height and at least one section with an increasing height. The height can be measured along the vertical axis of the secondary winding structure.

According to the invention, at least one section of at least one magnetically conductive element extends into the secondary winding structure or at least one subwinding structure of the secondary winding structure. This can mean that the at least one section extends into or through a volume or area enclosed by the subwinding structure.

In other words, at least one section of at least one magnetically conductive element can be arranged within the volume or area enclosed by a (sub)winding structure of the secondary winding structure. A height of a magnetically conductive element which is arranged within the volume enclosed by a subwinding structure can be larger than, equal to or smaller than the height of the subwinding structure. This advantageously further reduces an installation space requirement. Further, the arrangement of a magnetically conductive element within the volume advantageously increases the amount of field lines of the alternating electromagnetic field which extend through said volume as the magnetically conductive element serves as a field collector.

It is possible that 30% to 70%, preferably 45% to 55%, of the volume enclosed by the subwinding structure is filled with one or multiple magnetically conductive elements.

If an arrangement of multiple magnetically conductive elements comprises one or multiple rows of more than one magnetically conductive element, the magnetically conductive elements of one row can be arranged such at least one section of the secondary winding structure is arranged within the recess provided by the row, wherein at least one other section of the row is arranged within the volume or area enclosed by the (sub)winding structure.

In another embodiment, the arrangement of magnetically conducting elements comprises multiple bar elements. These bar elements can be arranged such that the bar elements extend along the longitudinal axis. Multiple bar elements can be arranged along or parallel to a straight line parallel to the longitudinal axis, wherein these multiple bar elements can abut or overlap at front end or rear sections of the bar elements. Such an arrangement can also be referred to as row of bar elements.

It is possible that the arrangement of multiple bar elements comprises multiple rows, wherein each row comprises one or multiple bar elements.

In another embodiment, the arrangement of magnetically conducting elements comprises multiple rows of at least one magnetically conductive element, wherein a non-zero gap between two adjacent rows is provided along the lateral direction. Each row comprises one or multiple bar elements extending along a line parallel to the longitudinal axis. The rows are spaced apart from another along or parallel to the lateral axis. The distance between two adjacent rows can be chosen from an interval of 0 mm (exclusive) to 50 mm (inclusive), preferably to 30 mm (inclusive). The non-zero gap advantageously allows to adjust or to provide a desired flux density within the volume or area enclosed by the subwinding structure.

In another embodiment, at least two magnetically conductive elements overlap each other. In particular, the at least two magnetically conductive elements can overlap each other at a front end or rear end section of the magnetically conductive elements. More particular, two successive magnetically conductive elements of one row of multiple magnetically conductive elements can overlap. This can mean that the at least two magnetically conductive elements are arranged at different vertical positions along the aforementioned vertical axis. Overlapping bar elements or sections thereof can mechanically contact each other.

In another embodiment, the least one magnetically conducting element or an arrangement of magnetically conducting elements provides a recess to receive at least a section of the secondary winding structure. In particular, the recess can be arranged and/or designed in order to receive a section of the secondary winding structure extending along or parallel to the lateral axis. More particular, the recess can be designed and/or arranged such that a section of the secondary winding structure at the transition from one subwinding structure to the successive subwinding structure along the longitudinal axis can be arranged within the recess. In the secondary-sided arrangement, at least one section of the secondary winding structure can be arranged within the recess.

In other words, magnetically conducting elements of an arrangement of multiple magnetically conductive elements can be arranged in a row. In this case, multiple magnetically conductive elements can be arranged successively along the longitudinal axis of the secondary winding structure. Further, at least two successive magnetically conductive elements are aligned with a vertical offset to one another. This can mean that a non-zero distance between the longitudinal axes of two successive magnetically conductive elements is provided along or against the vertical axis of the secondary winding structure. Further, there can be no vertical offset between every second magnetically conductive element in a row. The vertical offset can provide the recess.

If an arrangement of multiple magnetically conductive elements comprises one or multiple rows of more than one magnetically conductive element, the magnetically conductive elements of one row can be arranged such that a recess is provided. The recess can e.g. be provided if end sections of one magnetically conductive element, in particular an elongated element, overlap end sections of further magnetically conductive elements respectively.

It is, for instance, possible that one row comprises lower magnetically conductive elements and at least one upper magnetically conductive element, wherein the lower magnetically conductive elements are arranged within a volume or area enclosed by (sub)winding structures of the secondary winding structure, wherein an upper magnetically conductive element bridges the section of the winding structure between the volumes of two adjacent subwinding structures. In this case, a first end section of the upper magnetically conductive element can overlap an end section of a first lower magnetically conductive element, wherein another end section of the upper magnetically conductive element overlaps an end section of a second lower magnetically conductive element. The recess is provided between the lower magnetically conductive elements. An upper magnetically conductive element can be arranged with an offset along the vertical direction with respect to a lower magnetically conductive element. In other words, an upper magnetically conductive element can be arranged at a higher vertical position than the lower magnetically conductive element, i.e. above the lower magnetically conductive element.

In a cross section, this arrangement of magnetically conductive elements in the row provides a hat-like structure. The width of the recess can be adapted to the width of the section of the secondary winding structure to be received. This advantageously further reduces an installation space requirement.

In another embodiment, magnetically conducting elements of an arrangement of multiple magnetically conductive elements are arranged in a row. In this case, multiple magnetically conductive elements can be arranged along the longitudinal axis of the secondary winding structure. Further, at least two successive magnetically conductive elements are aligned with a lateral offset to one another. This can mean that a non-zero distance between the longitudinal axes of two successive magnetically conductive elements is provided along the lateral axis of the secondary winding structure. The lateral offset can be provided along or against the lateral axis of the secondary winding structure. Further, there can be no lateral offset between every second magnetically conductive element in a row.

The arrangement can comprise multiple rows, wherein a lateral offset between two successive magnetically conductive elements is only provided in selected but not in all rows. This means that the arrangement comprises one or more rows in which multiple magnetically conductive elements are arranged along the longitudinal axis of the secondary winding structure with no lateral offset and one or more rows in which at least two successive magnetically conductive elements are arranged along the longitudinal axis with the said lateral offset.

It is, of course, possible that in addition to a lateral offset, a vertical offset is provided between two successive magnetically conductive elements of one row.

By providing the lateral offset, it is possible to vary, e.g. increase, the gap between two adjacent rows along the lateral direction. This allows to arrange other components between the two adjacent rows. It is, for instance, possible that the secondary-sided arrangement comprises fixation means for fixing a lower part to a cover part of a housing for the secondary winding structure. Such a fixation means, e.g. a screw, can extend through the space provided by the increased gap between two adjacent rows of magnetically conductive elements.

Further, the secondary-sided arrangement can comprise at least one cable bearing element. The cable bearing element can denote an element adapted to position and/or to hold at least one winding structure or a part thereof. In particular, the cable bearing element can be adapted to position and/or to hold a plurality of line sections of one or more electric lines which can provide the phase line(s) of the secondary-sided arrangement. Further, the cable bearing element can be adapted to position and/or to hold at least one magnetically conductive element, preferably the magnetically conductive element(s) which is/are arranged within the volume enclosed by the subwinding structures of the secondary winding structure.

The cable bearing element can comprises recesses forming spaces and/or projections delimiting spaces for receiving at least a section of a winding structure. A section of a winding structure can be provided by a section of a line or of a conductor. The winding structure can extend through these spaces.

The cable bearing element can be provided by a casting. Preferably, the cable bearing element is provided by a magnetically non-conductive material, e.g. plastic.

The cable bearing element can be provided by or within a housing of the secondary winding structure or by or within a part thereof, e.g. within or by a lower part.

It is, for instance, possible to provide the cable bearing element by a lower part of a housing of the secondary winding structure. Then, the secondary winding structure can be arranged within the lower part of the housing, e.g. within recesses of the cable bearing element. Then, at least one magnetically conductive element can be arranged within the lower part of the housing. Then, a cover part can be arranged on the lower part and can be fixed to the lower part. The secondary winding structure and the magnetically conductive elements can then be fixed within the housing provided by the lower part and the cover part. The cover part can also be provided by a magnetically non-conductive material, e.g. plastic or aluminium.

Further, a length or pole pitch of the subwinding structures of a secondary winding structure varies, in particular along the longitudinal axis. This means that the length of at least one subwinding structure of the secondary winding structure is different from, e.g. longer or shorter than, the length of at least one of the remaining subwinding structures of said secondary winding structure.

Alternatively, the pole pitch provided by at least one subwinding structure of the secondary winding structure can be different, e.g. longer or shorter, from the pole pitch provided by at least one of the remaining subwinding structures of said secondary winding structure.

The longest length or longest pole pitch can be 1.05 to 1.3 times longer than the shortest length or pole pitch of/provided by a subwinding structure of one winding structure.

Further proposed is a method for inductively supplying power to a vehicle. The method can be performed by a primary-sided arrangement according to one of the embodiments described in this invention or the system according to one of the embodiments described in this invention. Within the method, operating currents, in particular the aforementioned first, second and third operating currents, are supplied to the phase lines of the primary-sided arrangement. A first operating current is supplied to the first winding structure, wherein a second operating current is supplied to the second winding structure, wherein a third operating current is supplied to the third winding structure. Further, a phase shift between the first and the third operating current can be higher than a phase shift between the first and the second operating current.

Preferably, the phase shift between the first and the third operating current can be higher than a phase shift between the first and the second operating current if corresponding subwinding structures are designed and/or arranged such that directions of the magnetic fluxes generated by the first subwinding structures of the first and second winding structure are equal, wherein said directions are oriented opposite to the direction of the magnetic flux generated by the first subwinding structure of the third winding structure if either a positive or negative current flows through the corresponding subwindings.

Preferably, the phase shift between the first and the second operating current is 120°, wherein the phase shift between the first and the third operating current is 240°.

Alternatively, the phase shift between the first and the third operating current can be lower than a phase shift between the first and the second operating current if corresponding subwinding structures are designed and/or arranged such that directions of the magnetic fluxes generated by the first subwinding structures of the first and second winding structure are equal to the direction of the magnetic flux generated by the first subwinding structure of the third winding structure if either a positive or negative current flows through the corresponding subwindings.

Thus, an electromagnetic field is generated by the primary winding structures which is received by the at least one secondary winding structure. Further, an AC current is generated by the at least one secondary winding structure if the electromagnetic field is received.

In another embodiment, in a standard operational mode, the first operating current, the second operating current and the third operating current are controlled such that a predetermined phase shift between all three operating currents is provided.

In particular, the phase shift between the first operating current and the second operating current can be 120° phase angle. Accordingly, the phase shift between the second operating current and the third operating current can be 120° phase angle. Thus, the phase shift between the first operating current and the third operating current is 240° phase angle. Thus, in a standard operational mode, a set of non-zero phase shift values comprises two different non-zero phase shift values, for example 120° and 240°.

In other words, a first difference current between the first operating current and the second operating current, in particular a time course of the difference current, is different from a second difference current between the second operating current and the third operating current which is again different from a third difference current between the first operating current and the third operating current.

Controlling the operating currents or the phase angle of the operating current can be done by adequately controlling switching times of the switching elements of the inverter. In an alternative to controlling the phase angle of the operating currents, the phase angles of the operating voltages of the winding structures can be controlled according to the same aspects as described for the control of the operating currents.

In another embodiment, in a modified operational mode, the first operating current, the second operating current and the third operating current are controlled such that the set of phase shift values comprises at most two non-zero values and all non-zero phase shift values are equal.

The set of phase shift values can comprise three values, e.g. the value of the phase shift between the first and the second operating current, the value of the phase shift between the second and the third operating current and the value of the phase shift between the first and the third operating current.

The set of phase shift values between existing operating currents can comprise only one non-zero value. This e.g. means that the number of non-zero phase shifts is reduced to one.

Alternatively, the set of phase shift values between existing operating currents can comprise two non-zero values, wherein these values are equal. In this case, the remaining phase shift value can be zero. This means that the number of different non-zero phase shift values within the set of phase shift values is reduced. In this case, there are no non-zero phase shift values which are different from each other.

This means that the values of all phase shifts between the operating currents are either equal to a specific non-zero value or equal to zero.

In other words, only one or only two of the existing phase difference currents are non-zero. In a first alternative, there is only one difference current between the phases within the modified operational mode which is non-zero. This holds especially for the case where one of the three phase lines is switched off and thus only one phase difference current exists. Alternatively, all three phases are supplied with a corresponding operating current, wherein two of the three difference currents are equal and one of the difference currents is zero. This holds especially for the case, wherein the current course of the operating currents of two of the three operating currents are equal.

The modified operational mode can e.g. be activated depending on a geometric alignment of the primary winding structure to a secondary winding structure. This will be explained later.

This advantageously allows meeting desired power transfer criteria, especially in the case where there is a misalignment between the primary and the secondary winding structure.

It can be assumed that a reference relative position and/or orientation between the primary winding structure and the secondary winding structure exists, wherein, in the standard operational mode, the primary system is tuned at a certain operating frequency, e.g. 20 kHz, if the primary winding structure and the secondary winding structure are arranged with this reference relative position and/or orientation.

In this context, tuned can mean that no or only minimal reactive power is demanded or drawn from a wayside power supply, e.g. the WPC. In the context of this invention, the WPC can denote an inverter which can also be referred to as primary-sided inverter. In a special case, tuned can mean that the phase current and the phase voltage of each phase line are in phase, at least at the first harmonic frequency of the operating current/current. In other words, the operating frequency matches a resonant frequency of the electric circuit which is connected to the input terminal of the respective phase line. Said electric circuit does not only comprise primary-sided elements, but also secondary-sided elements which are transferred to the primary side.

If the primary winding structure and the secondary winding structure are arranged with this reference relative position and/or orientation, the primary unit and the secondary unit are aligned.

The alignment between the primary winding structure and the secondary winding structure can e.g. be expressed with reference to a primary-sided reference point and a secondary-sided reference point. A primary-sided reference point can e.g. be a geometric center of one of the phase lines, e.g. the first phase line. In particular, the reference point can be the geometric center of the first sub-winding of the first phase line.

A secondary-sided reference point can be a geometric center of a phase line, in particular of the first phase line, of the secondary winding structure. In particular, the reference point can be the center point of the first sub-winding of the first phase line of the secondary winding structure.

The alignment can then be expressed with respect to the primary-sided coordinate system which comprises the primary-sided longitudinal, lateral and vertical axes.

The origin of the primary-sided coordinate system can e.g. be located at the primary-sided reference point. With respect to such a primary-sided coordinate system, a relative position and/or orientation between the primary winding structure and the secondary winding structure can be expressed.

In the case of a misalignment, e.g. a deviation from the reference relative position and/or orientation, the transformer provided by the primary side and the secondary side will detune. This, in turn, will cause a drop in the power transfer performance and increase losses on the primary side, in particular within a primary-sided inverter. To compensate for said decrease in the power transfer performance, higher currents on the primary side are required which, in turn, will generate higher losses and reduce the total power transfer efficiency.

This effect especially holds for primary units with small geometric dimensions, wherein a small misalignment will result in a significant drop of the power transfer performance. In other words, primary units with small dimensions feature a lower tolerance regarding misalignment.

It is, for instance, possible that in the case of a misalignment of the secondary winding structure, e.g. of the pick-up, a large portion of the primary winding structure, in particular a portion of a phase line of the primary winding structure, will not be covered by portion of the secondary winding structure. In the context of this invention, covered means that the primary winding structure and the secondary winding structure overlap in a common plane of projection which may be oriented perpendicular to the aforementioned vertical direction. In the case of incomplete coverage, injected energy into the primary winding structure will not contribute to the inductive energy transfer process effectively.

By activating the modified operational mode in case of a misalignment, the aforementioned disadvantages, in particular the drop in the power transfer performance and the higher currents in the primary winding structure, can advantageously be fully or at least partially compensated.

In another embodiment, one of the operating currents is reduced to zero. It is important that only one of the three operating currents is reduced to zero. In other words, one of the three operating currents is switched off. The corresponding phase line is thus not operated. Thus, only two of the three input voltages exist. In this case, the set of phase shift values comprises only one value, wherein said value is a non-zero value. This effectively provides a virtual single phase system, wherein a virtual single phase line is provided between the input terminals of the operated phase lines. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Reducing one of the operating currents to zero is especially effective in the case of an undesired reduced air gap between the primary winding structure and the secondary winding structure. For a desired inductive power transfer, an air gap with a predetermined width, which can also be denoted as vertical displacement, may be provided. If the width of said air gap is reduced, e.g. due to a flat tire or a heavy load within the vehicle, extra voltages can be generated within the secondary winding structure in case of an inductive power transfer. These extra voltages can damage secondary-sided elements, e.g. the rectifier or capacitors.

By turning off one phase line, the amount of transferred energy is reduced. This, in turn, advantageously reduces or even eliminates the aforementioned extra voltages on the secondary side. Another advantage is that, compared to the standard operational mode, an input DC current to an inverter on the primary side can be reduced.

In another embodiment the remaining operating currents are controlled such that the non-zero phase shift value is 180° phase angle. If e.g. the second phase line is turned off, the phase angle of the third operating current can be increased by 60° which provides a phase shift between the first and the third operating current of 180°. By adjusting the phase shift to 180°, a higher AC voltage falls across the input terminals of the remaining phase lines. Said AC voltage can e.g. be applied to a current-shaping filter on the primary side which generates a higher current in the primary winding structure. This higher current advantageously increases the inductive energy transfer to the secondary side. However, the DC input voltage for primary-sided inverter is not increased.

In an alternative embodiment, two of the three operating currents are controlled such that their respective current curves are equal. This means that time courses of the operating currents are equal. In other words, the phase angle between each of these two (controlled) operating currents and the remaining operating current is equal.

In this case, the set of phase shift values can still comprise three values, wherein one value is zero and the remaining two values are equal and non-zero.

Such a control also provides a virtual single phase system. If e.g. the voltage curves of the second and the third operating currents are equal, the virtual single phase line is provided between the input terminal of the first phase line and the input terminals of the third and the second phase line which have the same potential. An input terminal can correspond to the feeding point of the respective winding structure. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Controlling two of the three operating currents such that their respective current curves are equal can e.g. increase the current within a phase line providing a fully covered section of primary winding structure, wherein currents in a phase line providing a partially-exposed section of the primary winding structure will be reduced. By reducing the current in the phase lines providing partially-exposed sections of the primary side winding structure, the amount of conduction loss within these sections of the primary side winding structure will reduce advantageously. By a higher current in the phase line providing the fully-covered primary side windings, the range of acceptable misalignments will be advantageously expanded.

In total, by activating the modified operational mode, the amount of transferred energy is distributed among the phase lines such that the most effective power transfer is provided. Especially in the case of a misalignment between the primary side winding structure and the secondary side winding structure, the primary-sided phase lines will be detuned. This is e.g. due to an increase stray inductance which is provided by the misalignment. The detuning will result in a capacitive or inductive reactance which, in turn, can lead to the effect that the phase current and phase voltage are not in phase anymore. Thus, additional reactive power has to be provided by an inverter and there is no possibility of zero current switching or zero voltage switching anymore. In case of such a detuning due to misalignment, no common frequency for the operating currents can be found which will compensate the detuning effect and provide a system which can be operated in a tuned state. The proposed modified operational mode overcomes this problem by creating the aforementioned virtual single phase line.

Further, the phase angle of at least one of the two operating currents can be shifted by a multiple of +/−60°.

PCT/EP2014/074889 describes more aspects and details related to the control in the standard operational mode and the modified operational mode. The disclosure of PCT/EP2014/074889 is, however, related to the control of phase input voltages. The disclosure of PCT/EP2014/074889 is therefore fully incorporated by reference, wherein the aspects and details concerning phase input voltages can be applied to the operating currents.

Further described is an embodiment, wherein the phase shift value(s) between the operating currents can be varied such that a desired alternating current output voltage or rectified output voltage of the secondary winding structure which is generated upon reception of the electromagnetic field generated by the primary winding structure is provided. This embodiment can provide subject-matter for an independent invention. Thus, a method for inductively supplying power to a vehicle is described, wherein operating currents are supplied to the winding structures of a primary-sided arrangement, wherein a first operating current is supplied to the first winding structure, wherein a second operating current is supplied to the second winding structure and wherein a third operating current is supplied to the third winding structure. Further, the phase shift value(s) can be varied such that a desired alternating current output voltage or rectified output voltage of the secondary winding structure which is generated upon reception of the electromagnetic field generated by the primary winding structure is provided.

In particular, the phase shift value(s) can be varied depending on charging characteristics of a secondary-sided energy storage element. In particular, the phase shift value(s) can be varied depending on a state of charge of the secondary-sided energy storage element. The secondary-sided energy storage element can be an element which is electrically connected to a secondary winding structure of a system for inductive power transfer.

It is possible to vary phase shift values based on the phase shift values in an activated modified operational mode. This can also be referred to as flexible modified operational mode. In other words, the phase shift value(s) of one, two or all operating currents can be varied based on the phase shift values in the modified operational mode.

It is possible that alternating current output voltage of the secondary winding structure (which is generated upon reception of the electromagnetic field generated by the primary winding structure) is rectified, e.g. by a rectifier. The rectified output voltage can be supplied to the at least one energy storage element which can also be referred to as energy storage module. The rectified output voltage denotes the output voltage provided by the rectifier, wherein the rectifier is a vehicle-sided element. Moreover, the alternating output current of the secondary winding structure can also be rectified and supplied to the energy storage element. Depending on the design of the secondary winding structure, the secondary winding structure can provide a voltage source or a current source.

The energy storage element can be an electric element of an electric network of the vehicle, in particular a capacitive element. In particular, the energy storage element can be an element of a DC part of the vehicle-sided electric network.

The energy storage element can e.g. be a battery or an accumulator, in particular a traction battery of the vehicle. Alternatively or in addition, the energy storage element can be a capacitive element, in particular an intermediate circuit capacitor, of a vehicle-sided electric network, e.g. an intermediate circuit. The intermediate circuit can be a portion of a vehicle-sided traction network. The rectified voltage or the intermediate circuit voltage can e.g. be supplied to a vehicle-sided converter, wherein the vehicle-sided converter generates an AC voltage for operating a vehicle-sided electric machine and/or any other vehicle-sided appliance. Thus, the rectified output voltage can be used to transfer electric power to the vehicle-sided electric network, e.g. the battery, in particular the traction battery, of the vehicle in order to charge said battery. Alternatively or in addition, the rectified output voltage can be used to transfer electric power to the electric machine via the intermediate circuit capacitor in order to operate the electric machine. This can be referred to as dynamic energy transfer. It is, of course, possible that the traction battery is electrically connected to the intermediate circuit capacitor.

The rectified output voltage of the secondary winding structure can also be referred to as transfer voltage, rectified voltage or DC link voltage. The rectified output current of the secondary winding structure can also be referred to as transfer current or rectified current.

The rectified output voltage and/or output current can be adjusted by varying the phase shift value(s). It is, of course, possible that the rectified output voltage and/or rectified output current is additionally adjusted by adjusting other input variables, e.g. a field strength.

Preferably, the phase shift value(s) is/are adjusted in order to prepare an energy transfer process, in particular an energy transfer process from the primary side to the secondary-sided electric network. Preparing a transfer process can mean that the phase shift value(s) is/are adjusted before the beginning of a transfer process. The transfer process can denote a process of transferring energy to the aforementioned vehicle-sided electric network, e.g. battery, e.g. traction battery, and/or to the aforementioned capacitive element, e.g. the intermediate circuit capacitor. If the transfer process is used for charging an energy storage element, it can also be referred to as charging process. In this case, the transfer voltage can also be referred to as charging voltage and the transfer current can also be referred to as charging current.

Alternatively or in addition, the phase shift value(s) can be adjusted in order to initiate an energy transfer process. In this case, the phase shift value(s) can be adjusted such that the desired rectified output voltage is higher than the actual output voltage of the energy storage element. In this case, a transfer current is supplied to the energy storage element. A transfer current can denote a current which flows into the energy storage element.

Alternatively or in addition, the phase shift value(s) is/are adjusted in order to control the energy transfer process. In this case, the phase shift value(s) can be adjusted during the energy transfer process.

Generally, the phase shift value(s) can be adjusted such that at least one desired transfer parameter, e.g. a desired output power, output voltage and/or output current of the secondary winding structure, is provided. It is, for instance, possible to adjust the phase shift value(s) such that a desired output power, output current and/or output voltage is maintained or corresponds to a desired time course of the transfer parameter.

The phase shift value(s) can also be adjusted depending on charging characteristics of the at least one energy storage element. In particular, the phase shift value(s) can be adjusted depending on a state of charge (SOC) of the energy storage element. Depending on the SOC, an actual total storage element voltage, e.g. an open circuit voltage, of the energy storage element can be determined, wherein the desired rectified output voltage can be determined in order to prepare or to initiate or to control an energy transfer process, wherein the phase shift value(s) can be adjusted such that the desired rectified output voltage is provided.

Information on the actual charging characteristic, e.g. the SOC, and/or the transfer current can be determined and transmitted from the secondary side to the primary side, e.g. via at least one communication means. Based on the transmitted information, a primary-sided control unit can adjust the phase shift value(s), e.g. by controlling the WPC.

Further described is an embodiment, wherein a switching time within the control of the switching elements of the primary-sided inverter is varied, wherein a switching time of a switching element of a switching leg of the inverter is determined such that a desired pulse width is provided (first condition) and a desired phase shift between the operating currents is provided (second condition) and a current through a freewheeling diode which is connected parallel to the switching element is oriented in the conducting direction of the freewheeling diode (third condition). This embodiment can provide subject-matter for an independent invention. Thus, a method for inductively supplying power to a vehicle is described, wherein operating currents are supplied to the winding structures of a primary-sided arrangement, wherein a first operating current is supplied to the first winding structure, wherein a second operating current is supplied to the second winding structure and wherein a third operating current is supplied to the third winding structure. Further, the switching time within the control of the switching elements of the primary-sided inverter is varied, wherein a switching time of a switching element of a switching leg of the inverter is determined such that a desired pulse width is provided and a desired phase shift between the operating currents is provided and a current through a freewheeling diode which is connected parallel to the switching element is oriented in the conducting direction of the freewheeling diode The inverter which provides the operating currents for the winding structures can have three switching legs, wherein each switching leg can comprise two switching elements connected in series. A switching element can e.g. be an IGBT or a MOSFET. The three switching legs can be connected in parallel.

To each switching element, a freewheeling diode can be connected in parallel, wherein a conducting direction of the freewheeling diode is oriented reverse to the conducting direction of the switching element. Further, a capacitance can be connected in parallel to each switching element.

The inverter can be connected to the winding structures by a filter element. Thus, the primary-sided arrangement can comprise at least one, preferably three, filter elements. A filter element can e.g. be designed as a resonant circuit filter, wherein a resonant circuit filter can comprise at least one inductive element and at least one capacitive element. The filter element is designed such that undesired harmonics of the alternating voltage or alternating current output signal of the inverter are reduced. It is, for instance, possible that a section of the switching leg between the two switching elements is connected to a filter element, e.g. an inductive element of the filter element, wherein the filter element is connected to a feeding point of a winding structure.

Due to the capacitances, resistances and inductances in the electric network comprising the inverter and filter elements, current oscillations can occur after a switching event, in particular if a switching element is switched off. Especially in case of a star connection of all filter elements, current oscillations in the filter elements which is connected to the switching leg comprising the switching element which has performed a switching action will result in current oscillations in at least one of the remaining filter elements. Now, the switching time of a switching element in a switching leg connected to one of the remaining filter elements should be chosen such that the stated conditions are fulfilled. This advantageously extends a time window of feasible switching time points. This again allows to flexibly adapt switching times in order to adjust an operating current, in particular an amplitude of the operating current. In other words, a switching time-based control of the operating current is described.

Corresponding to the explanations related to the variation of the phase shift value(s), the rectified output voltage and/or output current can be adjusted by varying the switching time within the control of the switching elements of the primary-sided inverter. It is, of course, possible that the rectified output voltage and/or rectified output current is additionally adjusted by adjusting other input variables, e.g. a field strength.

Preferably, the switching time(s) is/are adjusted in order to prepare an energy transfer process, in order to initiate an energy transfer or to control an energy transfer Generally, the switching time(s) can be adjusted such that at least one desired transfer parameter, e.g. a desired output power, output voltage and/or output current of the secondary winding structure, is provided. It is, for instance, possible to adjust the switching time(s) such that a desired output power, output current and/or output voltage is maintained or corresponds to a desired time course of the transfer parameter.

The switching time(s) can also be adjusted depending on charging characteristics of the at least one energy storage element. In particular, the switching time(s) can be adjusted depending on a state of charge (SOC) of the energy storage element. Depending on the SOC, an actual total storage element voltage, e.g. an open circuit voltage, of the energy storage element can be determined, wherein the desired rectified output voltage can be determined in order to prepare or to initiate or to control an energy transfer process, wherein the phase shift value(s) can be adjusted such that the desired rectified output voltage is provided.

Further described is a method of manufacturing a primary-sided arrangement of primary winding structures. The method includes all steps to provide a primary-sided arrangement according to one of the embodiments described in this invention.

BRIEF DESCRIPTION OF THE DRAWINGS

The invention will be described with reference to exemplary embodiments of the invention which are illustrated by the following figures. The figures show.

DESCRIPTION OF THE INVENTION

In the following, the same numerals denote elements with the same or similar technical features.

Figure 1:
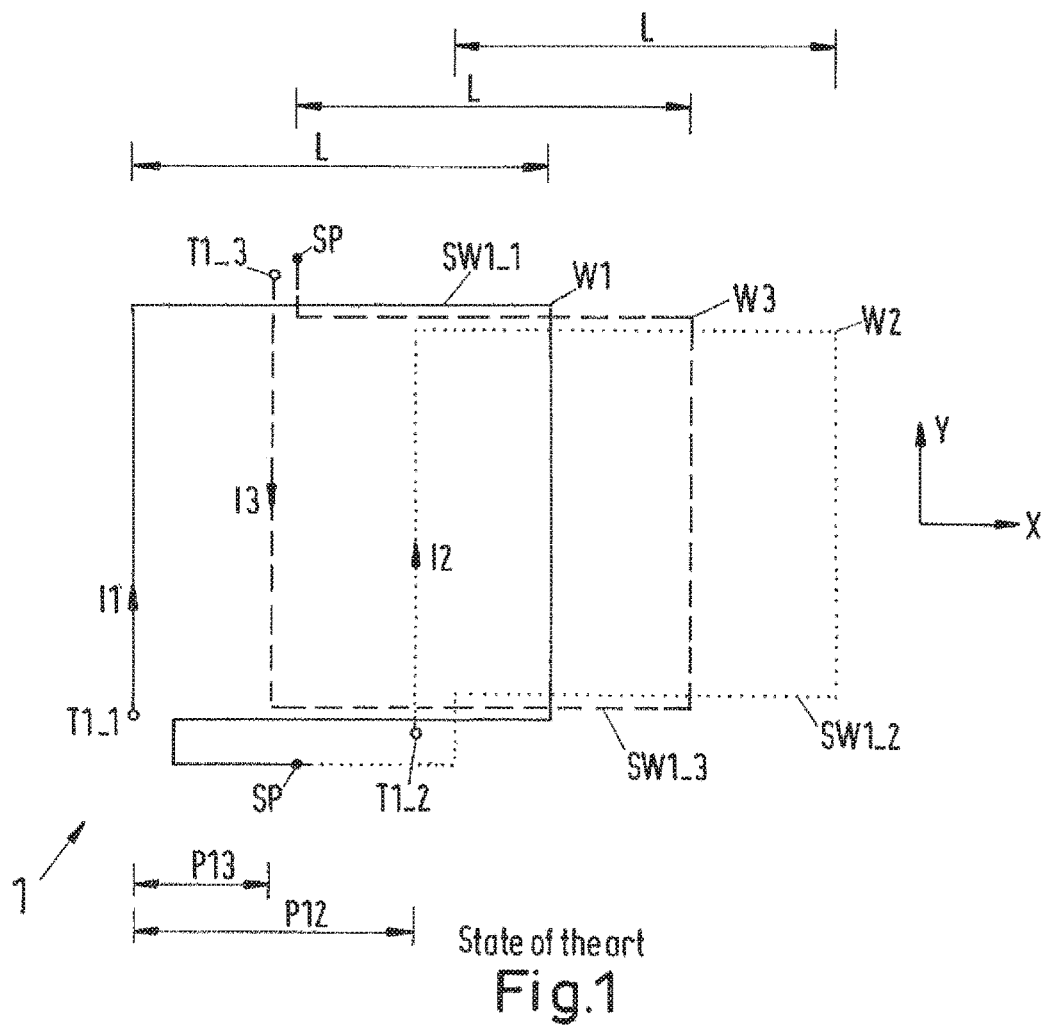
FIG. 1: a schematic top view on a primary-sided arrangement of primary winding structures.
Figure 4:
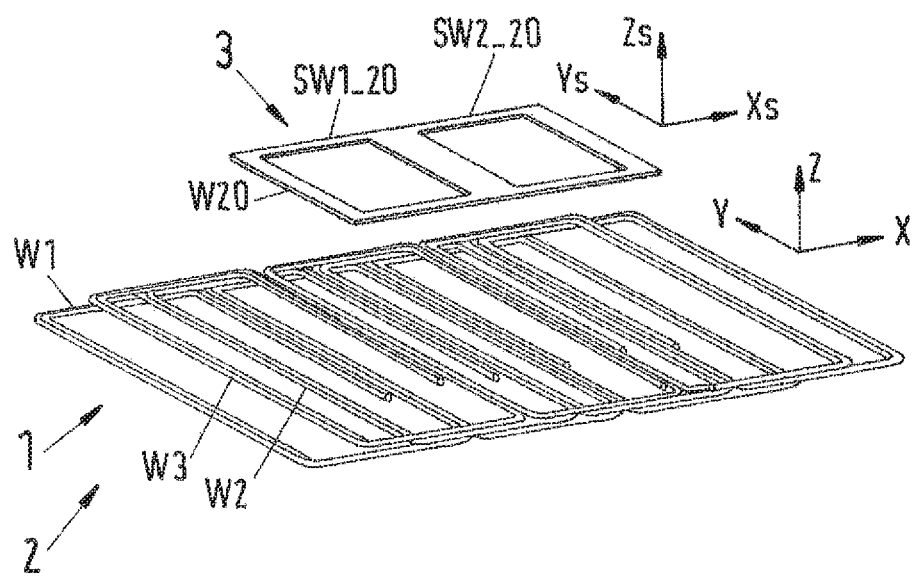
FIG. 4: the primary-sided arrangement of FIG. 3 and a secondary-sided arrangement of winding structures.

FIG. 1 shows a schematic top view on a primary-sided arrangement 1 of primary winding structures W1, W2, W3 of a system 2 for inductive power transfer (see FIG. 4). The primary-sided arrangement 1 comprises a first winding structure W1 with one subwinding structure SW1_1. Further, the primary-sided arrangement 1 comprises a second winding structure W2 and a third winding structure W3 which have one subwinding structure SW1_2, SW1_3, respectively. These winding structures W1, W2, W3 provide each a phase line of a three phase topology. In the example shown in FIG. 1, the subwindings SW1_1, SW1_2, SW1_3 have the shape of a rectangular loop.

Further shown is a primary-sided coordinate system with a primary-sided longitudinal axis x and a primary-sided lateral axis y. Directions of these axes x, y are indicated by arrows. These axes x, y span a plane, wherein the winding structures W1, W2, W3 are substantially arranged in planes parallel to said plane. A primary-sided vertical axis z (see FIG. 3) is oriented perpendicular to said plane. It is possible that the winding structures W1, W2, W3 are arranged in different planes in order to overlap each other.

The winding structures W1, W2, W3 extend along the longitudinal axis x. A length L of each subwinding SW1_1, SW1_2, SW1_3 is equal for every subwinding SW1_1, SW1_2, SW1_3 of each winding structure W1, W2, W3. The length L is measured along the longitudinal axis x. That the winding structures W1, W2, W3 extend along the longitudinal axis x can mean that geometrical centres of each subwinding SW1_1, SW1_2, SW1_3 are arranged along a straight line parallel to the longitudinal axis x.

Each subwinding SW1_1, SW1_2, SW1_3 comprises sections which extend along the longitudinal axis x and sections which extend along the lateral direction y. The length L denotes the distance between two successive sections of a subwinding SW1_1, SW1_2, SW1_3 which extend parallel to the lateral axis y.

Further shown is a pitch P12 between corresponding subwinding structures SW1_1, SW1_2 of the first and the second winding structure W1, W2. The pitch is shown as the distance along the longitudinal axis x of corresponding lateral sections of the respective subwinding structures SW1_1, SW1_2. The pitch P12, however, can also denote a distance between the geometrical centres of the subwinding structures SW1_1, SW1_2 along the longitudinal axis x.

Further shown is a pitch P13 between corresponding subwinding structures SW1_1, SW1_3 of the first and the third winding structure W1, W3. It is shown that the pitch P12 is equal to ⅔ of the length L, wherein the pitch P13 is equal to ⅓ of the length L.

Further shown are feeding points T1_1, T1_2, T1_3 of the winding structures W1, W2, W3 which allow supplying an operating current I1, I2, I3 to each winding structure W1, W2, W3. In a regular operation of the winding structures W1, W2, W3 in order to generate an electromagnetic field for inductive power transfer, a first operating current I1 is supplied to the first winding structure W1, wherein a second operating current I2 is supplied to the second winding structure W2, wherein a third operating current I3 is provided to the third winding structure W3. In FIG. 1, arrows indicate the flow direction of a positive current I1, I2, I3. A flow direction of positive currents I1, I2, I3 is directed from the respective feeding point T1_1, T1_2, T1_3 to a common star point SP.

As seen in FIG. 1, the magnetic flux generated by the first subwinding structure SW1_1, SW1_2 of the first and the second winding structure W1, W2 will be oriented against a vertical direction z (see FIG. 3), wherein the magnetic flux generated by the first subwinding structure SW1_3 of the third winding structure W3 will be oriented in the vertical direction z. Further shown is that the feeding points T1_1, T1_2 of the first subwinding structure SW1_1, SW1_2 of the first and second winding structure W1, W2 and the feeding point T1_3 of the first subwinding structure SW1_3 of the third winding structure W3 are arranged on opposite sides of the primary-sided arrangement 1 of primary winding structures W1, W2, W3 to with respect to the lateral direction of the lateral axis y.

A phase shift between the first and the second operating current I1, I2 can be equal to 120°, wherein a phase shift between the first and the third operating current I1, I3 can be equal to 240°.

Figure 2:
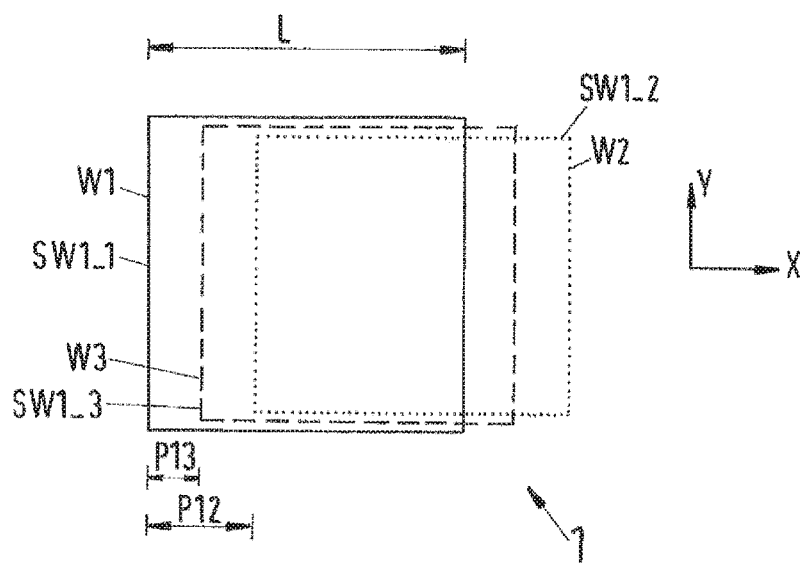
FIG. 2: a schematic top view on a primary-sided arrangement of primary winding structures according to the invention, FIG. 3a schematic perspective view on a primary-sided arrangement of primary winding structures according to another embodiment of the invention.

FIG. 2 shows a schematic top view on a primary-sided arrangement 1 of primary winding structures W1, W2, W3 according to the invention. It can be seen that the third winding structure W3 is set back along the longitudinal axis x. This means that the pitch P13 between corresponding subwinding structures SW1_1, SW1_3 of the first winding structure W1 and the third winding structure W3 is smaller than the pitch P12 between corresponding subwinding structures SW1_1, SW1_2 of the first and the second winding structure W1, W2. In FIG. 2, the pitch P13 is equal to ⅙ of the length L of the subwinding structures SW1_1, SW1_2, SW1_3, wherein the pitch P12 is equal to ⅓ of the length L.

Figure 3:
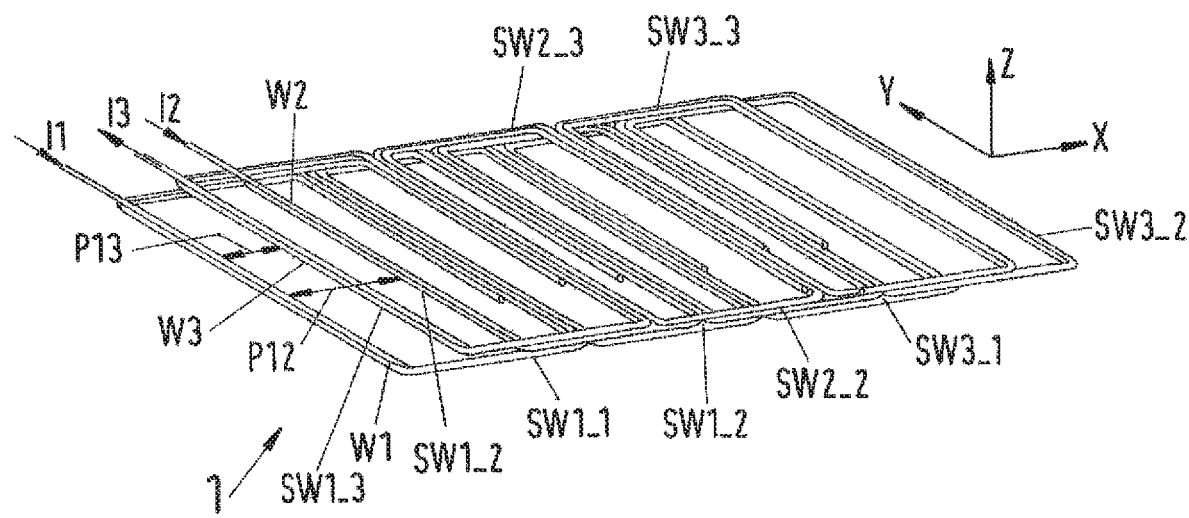

FIG. 3 shows a schematic perspective view on a primary-sided arrangement 1 of primary winding structures W1, W2, W3. It is shown that each winding structure W1, W2, W3 comprises three subwinding structures SW1_1, SW2_1, SW3_1, SW1_2, SW2_2, SW2_3, SW1_3, SW2_3, SW3_3 which all extend along the longitudinal axis x. Subwinding structures SW1_1, . . . , SW3_3 of one winding structure W1, W2, W3 are arranged adjacent to each other along the longitudinal axis x and do not overlap. FIG. 3, however, shows that the winding structures W1, W2, W3 are arranged in different planes which are oriented parallel to each other but arranged at different vertical positions along the vertical axis z. Further shown are the operating currents I1, I2, I3 of each winding structure W1, W2, W3. This has been explained previously.

Further shown are the pitches P12, P13 between corresponding subwinding structures SW1_1, SW1_2, SW1_3 of the winding structures W1, W2, W3, wherein the corresponding subwinding structures SW1_1, . . . , SW3_3 have the same position within the sequence of subwinding structures SW1_1, . . . , SW3_3 of one winding structure W1, W2, W3 along the longitudinal axis x.

FIG. 4 shows a perspective view on a system for inductive power transfer 2, wherein the system comprises a primary-sided arrangement 1 with primary winding structures W1, W2, W3 as shown in FIG. 3. The system further comprises a secondary-sided arrangement 3 of one secondary-sided winding structure W20. The secondary winding structure W20 comprises two adjacent subwinding structures SW1_20, SW2_20 which are arranged adjacent to each other along a secondary-sided longitudinal axis xs. Further, the secondary winding structure W20 is substantially arranged in a plane spanned by the secondary-sided longitudinal axis xs and a secondary-sided lateral axis ys which is oriented perpendicular to the secondary-sided longitudinal axis xs. Both secondary-sided axes xs, ys are oriented perpendicular to a secondary-sided vertical axis zs. The secondary-sided arrangement 3 can be part of a receiving unit attached to a vehicle, in particular an automobile. In this case, the secondary-sided longitudinal axis xs can be oriented parallel to a roll axis of the vehicle, the secondary-sided lateral axis ys can be oriented parallel to a pitch axis of the vehicle and the secondary-sided vertical axis zs can be oriented parallel to a yaw axis of the vehicle.

In an aligned state of the primary-sided arrangement 1 and the secondary-sided arrangement 3, corresponding axes x, xs; y, ys; z, zs are oriented parallel to each other. Further, a geometric centre of the secondary winding structure W20 can be arranged above an active area enclosed by the winding structures W1, W2, W3 of the primary-sided arrangement 1 or a predetermined subarea of said active area or a predetermined area comprising said active area.

The subwindings SW1_20, SW2_20 of the secondary winding structure W20 are also shaped as rectangular loops.

Figure 5:
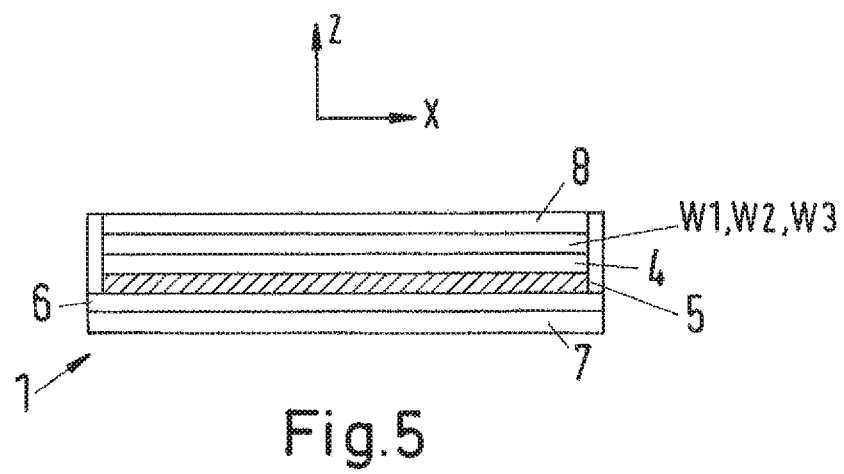
FIG. 5: a schematic cross section of a primary-sided arrangement according to another embodiment of the invention.

FIG. 5 shows a schematic cross section of a primary-sided arrangement 1. Schematically indicated are the winding structures W1, W2, W3 of the primary-sided arrangement 1. These winding structures W1, W2, W3 are arranged in a cable bearing element 4 which is adapted to position and/or to hold the winding sections of the winding structures W1, W2, W3 shown e.g. in FIG. 3.

Further shown are rows 5 with one or multiple ferrite elements of a ferrite arrangement which is arranged under the winding structures W1, W2, W3 with respect to the primary-sided vertical axis z.

Further shown is an insulating layer 6 and a magnetic shielding layer 7 which can e.g. be designed as an aluminium plate. Further shown is a cover element 8 which covers the cable bearing element 4 with the winding structures W1, W2, W3. The insulating layer 6 and the magnetic shielding layer 7 are arranged under the ferrite elements 5.

Figure 6:
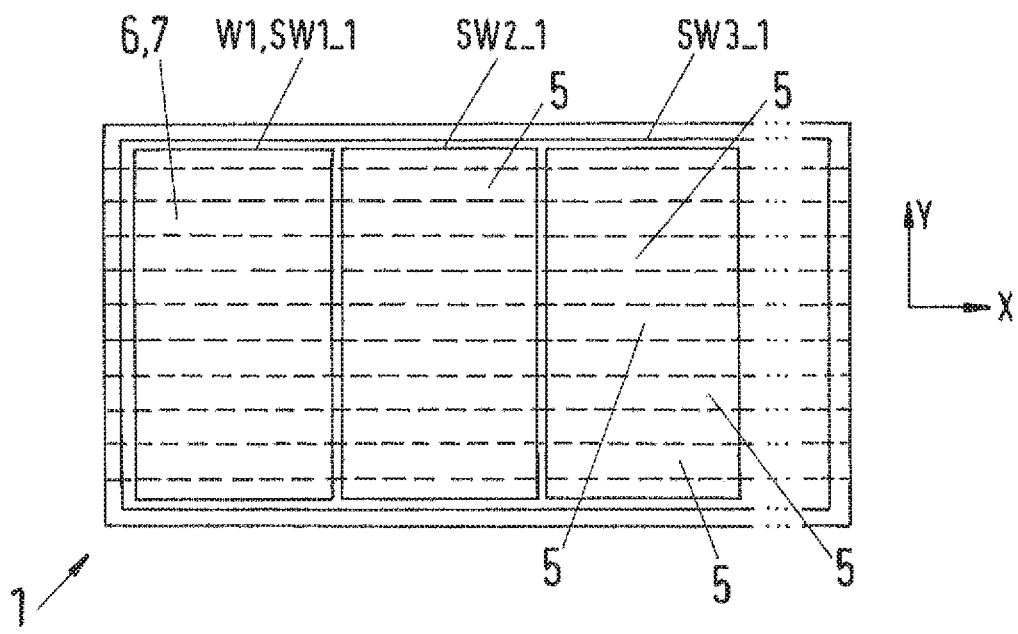
FIG. 6: a schematic top view on the primary-sided arrangement shown in FIG. 5, FIG. 7: a schematic perspective view on a secondary-sided arrangement of a winding structure.

FIG. 6 shows a schematic top view on the primary-sided arrangement 1 shown in FIG. 5. Shown is the first winding structure W1 with its subwinding structures SW1_1, SW2_1, SW3_1. Not shown are the second and third winding structure W2, W3. Further shown are the insulating layer 6 and the magnetic shielding layer 7.

Further shown is an arrangement of multiple rows 5 of ferrite elements, wherein one row 5 comprises multiple ferrite elements, e.g. ferrite bars. The rows 5 are e.g. designed as a ferrite bar or an arrangement of multiple ferrite bars which extend along the longitudinal axis x. Different rows 5 are arranged along the lateral axis y with a non-zero gap between two adjacent rows 5 along the lateral axis y.

Figure 7:
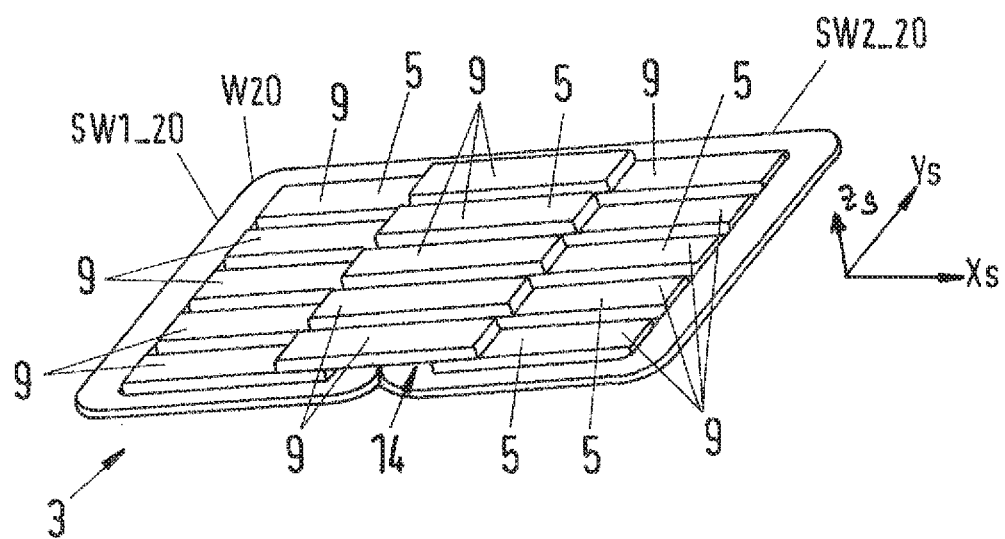

FIG. 7 shows a schematic perspective view on a secondary-sided arrangement 3 with a secondary winding structure W20. The secondary winding structure can be designed as the secondary winding structure W20 shown in FIG. 4. The secondary-sided arrangement 3 also comprises multiple, in particular five, rows 5 of ferrite bars 9. The rows 5 provide an arrangement of magnetically conductive elements.

One row 5 of ferrite elements comprises multiple ferrite bars 9, in particular three ferrite bars 9.

It is shown that the secondary-sided arrangement 3 and the primary-sided arrangement 1 shown in FIG. 6 have the same distance between adjacent rows 5 of ferrite bars It is further possible that the primary-sided arrangement 1 and the secondary-sided arrangement 3 have the same number of rows and/or the same number of ferrite elements within one row.

In particular, if the primary-sided arrangement 1 and the secondary-sided arrangement 3 are arranged in the previously explained aligned state, the ferrite arrangements 5 of the secondary-sided arrangement 3 are located opposite to the ferrite arrangements 5 of the primary-sided arrangement 1 with respect to the vertical axes z, zs.

FIG. 7 shows that the each row 5 and thus the arrangement of magnetically conductive elements provides a recess 14 to receive a section of the secondary-sided winding structure W20. In particular, adjacent sections of the subwinding structures SW1_20, SW2_20 which extend along the secondary-sided lateral axis ys are arranged within the recesses 14. A rear end section of one row 5, in particular a first ferrite bar 9 of said row 5, extends into an inner volume of the first subwinding structure SW1_20, wherein the inner volume denotes the volume enclosed by the rectangular loop providing the first subwinding structure SW1_20. A front end section of the row 5, in particular a third ferrite bar 9 of said row 5, extends into the inner volume of the second subwinding structure SW2_20. End sections of a centre section of the row 5, in particular of a second ferrite bar 9 of said row 5, overlap the first and the third ferrite bar 9, respectively such that the recess 14 is provided between the first and the third ferrite bar 9 of the row 5.

The first and the third ferrite bar 9 can also be referred to as lower ferrite bars, wherein the second ferrite bar 9 can be referred to as upper ferrite bar. With respect to the vertical direction zs, the second ferrite bar 9 is arranged above the adjacent sections of the subwinding structures SW1_20, SW2_20 which are arranged in the recess 14.

In other words, the first and the second ferrite bar 9 in each row are aligned with a non-zero vertical offset to one another, wherein the first and the third ferrite bar 9 in each row are aligned with no vertical offset to one another. The vertical offset between the first and the second ferrite bar 9 is provided along the vertical direction zs.

Figure 8:
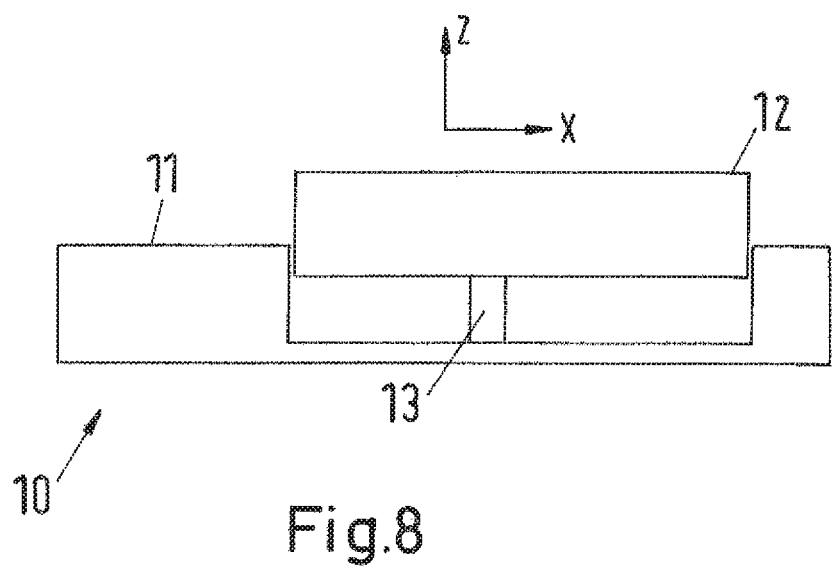
FIG. 8: a schematic side view of a primary unit, FIG. 9a schematic cross section of a secondary-sided arrangement of winding structures, FIG. 10 a schematic cross section of another secondary-sided arrangement of a winding structure, FIG. 11 a schematic top view on secondary-sided arrangement of a winding structure, and FIG. 12 a schematic explosive top view on three winding structure.

FIG. 8 shows a schematic side view of a primary unit 10 which comprises a stationary part 11 and a movable part 12. The primary-sided arrangement 1 can be arranged on or within the movable part 12. The movable part 12 can be moved along the vertical axis z by a positioning means 13. In particular, the movable part 12 can be moved from a retracted state into an extended state and vice versa.

Figure 9:
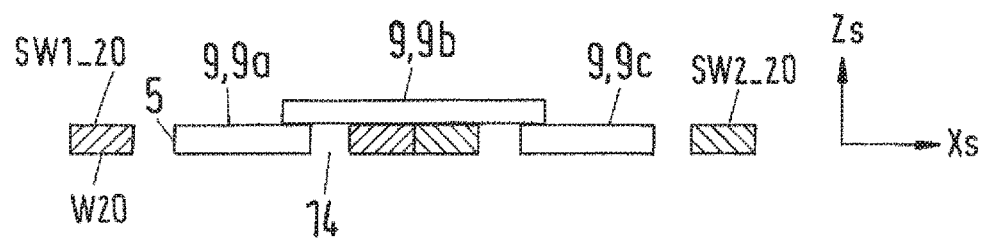

FIG. 9 shows a schematic cross section of a secondary-sided arrangement of the winding structure W20 shown in FIG. 7. It is shown that a rear end section of a second ferrite bar 9b overlaps a front end section of a first ferrite bar 9a. Further, a front end section of the second ferrite bar 9b overlaps the rear end section of a third ferrite bar 9c. It is further shown that the ferrite bars 9a, 9b, 9c have a constant height along their respective longitudinal axis. Two successive ferrite bars 9a, 9b, 9c are aligned with a vertical offset to one another. The vertical offset is chosen such that a recess 14 is provided between the first and the third ferrite bar 9a, 9c. The ferrite bars 9a, 9b, 9c are arranged in a row 5. The first and the third ferrite bar 9a, 9c can also be referred to as lower ferrite bars, wherein the second ferrite bar can be referred to as upper ferrite bar 9b. It is shown that end sections of successive ferrite bars 9a, 9b, 9c mechanically contact each other. In particular, a bottom side of the second ferrite bar 9b at the rear end section of the second ferrite bar 9b touches an upper side of the first ferrite bar 9a at the front end section of the first ferrite bar 9a. Further, a bottom side of the second ferrite bar 9b at the front end section of the second ferrite bar 9b touches an upper side of the third ferrite bar 9c at the rear end section of the third ferrite bar 9c.

Figure 10:
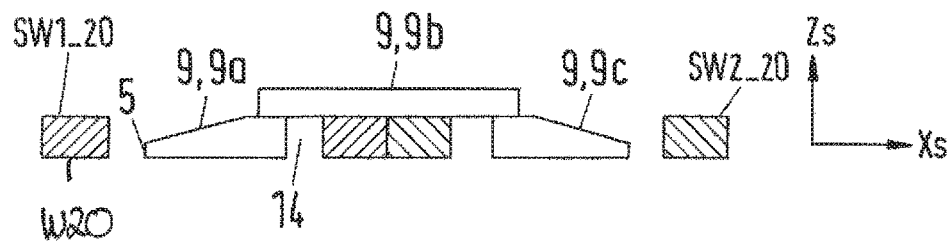

FIG. 10 shows a schematic cross section of another secondary-sided arrangement of a winding structure W20. The embodiment shown in FIG. 10 can be designed similar as the embodiment shown in FIG. 9. In contrast to the embodiment shown in FIG. 9, the first and the third ferrite bar 9a, 9c each have a section with a varying height along the longitudinal axis of the respective ferrite bar 9a, 9c.

Figure 11:
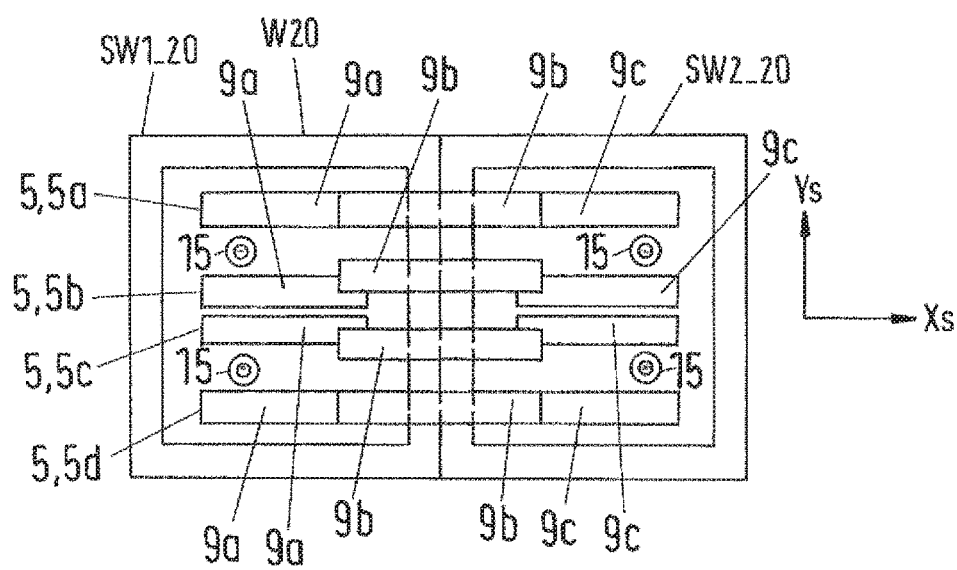

FIG. 11 shows a schematic top view on another embodiment of a secondary-sided arrangement of a winding structure W20. The embodiment shown in FIG. 10 can be designed similar as the embodiments shown in FIG. 7, FIG. 9 or FIG. 10. The secondary-sided arrangement comprises multiple rows 5 of ferrite bars 9a, 9b, 9c. In contrast to the embodiment shown in FIG. 7, the first and the second ferrite bar 9a, 9b in a second and a third row 5b, 5c are aligned with a lateral offset to one another. This means that a non-zero distance is provided between the longitudinal axes of the respective ferrite bars 9a, 9b along or against the lateral axis ys of the secondary winding structure W20. Further shown is that in the second and the third row 5b, 5c, the second and the third ferrite bar 9b, 9c are aligned with a lateral offset to one another. The arrangement of ferrite bars 9a, 9b, 9c in the second and the third row 5b, 5c is provided such that there is no lateral offset between the first and the third ferrite bar 9a, 9c.

The lateral offset between the first and the second ferrite bar 9a, 9b in the second row 5b is provided against the lateral axis ys, wherein the lateral offset between the second and the third ferrite bar 9b, 9c in the second row 5b is provided along the lateral axis ys.

The lateral offset between the first and the second ferrite bar 9a, 9b in the third row 5c is provided along the lateral axis ys, wherein the lateral offset between the second and the third ferrite bar 9b, 9c in the third row 5c is provided against the lateral axis ys.

In contrast to the second and the third row 5b, 5c, the ferrite bars 9a, 9b, 9c of a first and a fourth row 5a, 5d are aligned with no lateral offset.

The lateral offset increases a gap between the first ferrite bar 9a of the first row 5a and the first ferrite bar 9a of the second row 5b as well as between the third ferrite bar 9c of the first row 5a and the third ferrite bar 9c of the second row 5b.

Further, the gap between the first ferrite bar 9a of the third row 5c and the first ferrite bar 9a of the fourth row 5d as well as between the third ferrite bar 9c of the third row 5c and the third ferrite bar 9c of the fourth row 5d is increased.

It is indicated that fixation means 15 such as screws can be arranged in the enlarged gaps. This fixation means 15 can e.g. be used to fix a lower part to a cover part of a housing for the secondary winding structure W20.

As the embodiment shown in FIG. 7, the first and the second ferrite bar 9a, 9b in each row 5a, . . . ,5d are aligned with a non-zero vertical offset to one another, wherein the first and the third ferrite bar 9a, 9c in each row 5a, . . . ,5d are aligned with no vertical offset to one another.

Figure 12:
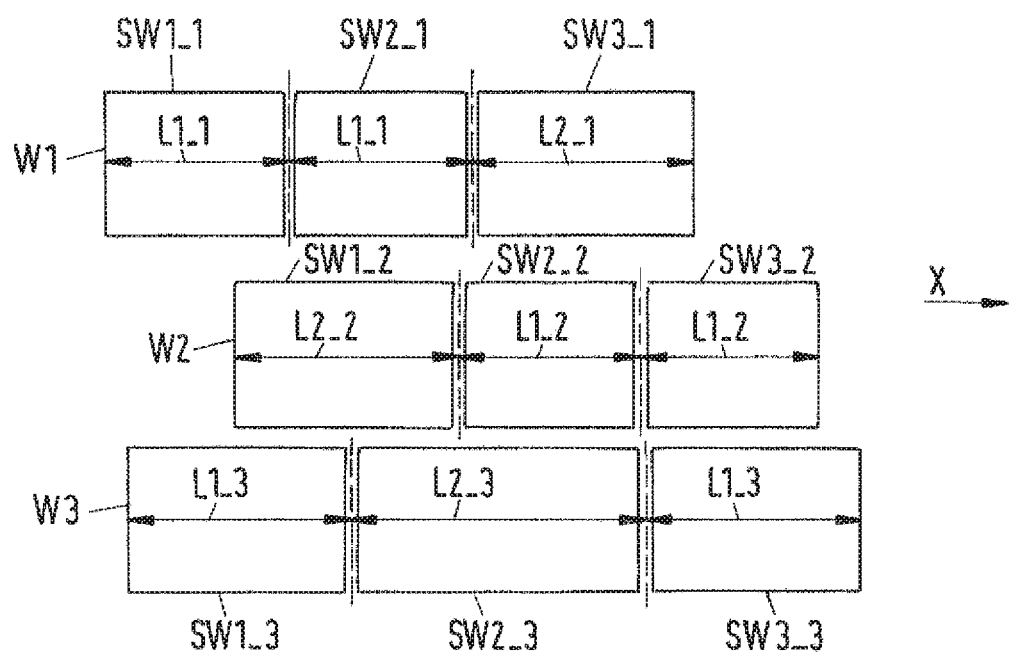

FIG. 12 shows a schematic explosive top view on three winding structures W1, W2, W3, wherein each winding structure W1, W2, W3 comprises three subwindings SW1_1, . . . ,SW3_3. FIG. 12 shows the lengths L1_1, . . . , L2_3 of the subwinding structures SW1_1, . . . SW3_3 of each winding structure W1, W2, W3 which can correspond to the pole pitch provided by each subwinding structure SW1_1, . . . SW3_3.

It is shown that for each winding structure W1, W2, W3, the lengths L1_1, . . . , L2_3 of the subwinding structures SW1_1, . . . SW3_3 varies along the longitudinal axis x.

The first and the second subwinding structure SW1_1, SW2_1 of the first winding structure W1 have a first length L1_1, wherein the third subwinding structure SW3_1 of the first winding structure W1 has a second length L2_1 which is longer than the first length L1_1.

The second and the third subwinding structure SW2_2, SW3_2 of the second winding structure W2 have a first length L1_2, wherein the first subwinding structure SW1_2 of the second winding structure W2 has a second length L2_2 which is longer than the first length L1_2.

The first and the third subwinding structure SW1_3, SW3_3 of the third winding structure W3 have a first length L1_3, wherein the second subwinding structure SW2_3 of the third winding structure W3 has a second length L2_3 which is longer than the first length L1_3.

The first length L1_1 of the first and second subwinding structure SW1_1, SW2_1 of the first winding structure W1 can be equal to the first length L1_2 of the second and third subwinding structure SW2_2, SW3_2 of the second winding structure W2. Also, the second length L2_1 of the third subwinding structure SW3_1 of the first winding structure W1 can be equal to the second length L1_2 of the first subwinding structure SW1_2 of the second winding structure W2. Further, the second length L2_1 of the third subwinding structure SW3_1 of the first winding structure W1 can be equal to the first length L1_3 of the first and third subwinding structure SW1_3, SW3_3 of the third winding structure W3.

The invention claied is:

1. A secondary-sided arrangement of at least one secondary winding structure, comprising:
at least one phase line; and
one secondary winding structure per phase line;
wherein the secondary-sided arrangement further comprises:
two or more subwinding structures, wherein the two or more subwinding structures include a first subwinding structure and a second subwinding structure;
an arrangement of magnetically conducting elements, wherein the arrangement of magnetically conducting elements comprises multiple rows of more than one magnetically conducting elements, wherein the magnetically conducting elements of one row provide a recess to receive at least a section of a secondary winding structure, wherein the recess is provided between a first and a second lower magnetically conducting element of the row, wherein a first end section of an upper magnetically conducting element of the row overlaps an end section of the first lower magnetically conducting element and another end section of the upper magnetically conducting element overlaps an end section of the second lower magnetically conducting element; and wherein the first lower magnetically conducting element extends into an inner volume of the first subwinding structure and the second lower magnetically conducting element extends into an inner volume of the second subwinding structure, wherein the secondary winding structure is substantially arranged within a two-dimensional plane.

2. The secondary-sided arrangement of claim 1, wherein the arrangement of magnetically conducting elements comprises multiple bar elements.

3. The secondary-sided arrangement of claim 1, wherein the arrangement of magnetically conducting elements comprises multiple rows of at least one magnetically conducting element, wherein a non-zero gap between two adjacent rows is provided along the lateral direction.

4. The secondary-sided arrangement of claim 1, wherein the at least one magnetically conducting element or the arrangement of magnetically conducting elements provides a recess to receive at least a section of the secondary winding structure.

5. The secondary-sided arrangement of claim 1, wherein magnetically conducting elements of an arrangement of multiple magnetically conducting elements are arranged in a row, wherein at least two successive magnetically conducting elements are aligned with a lateral offset to one another.

6. A secondary-sided arrangement of at least one secondary winding structure, comprising:
    at least one phase line; and
    one secondary winding structure per phase line;
    wherein the secondary-sided arrangement comprises at least one magnetically conducting element or an arrangement of magnetically conducting elements;
    wherein at least one section of the at least one magnetically conducting element extends into the secondary winding structure or at least one subwinding structure of the secondary winding structure; and
    wherein magnetically conducting elements of the arrangement of multiple magnetically conducting elements are arranged in a row, wherein at least two successive magnetically conducting elements are aligned with a lateral offset to one another.

7. The secondary-sided arrangement of claim 6, wherein the arrangement of magnetically conducting elements comprises multiple bar elements.

8. The secondary-sided arrangement of claim 6, wherein the arrangement of magnetically conducting elements comprises multiple rows of at least one magnetically conducting element, wherein a non-zero gap between two adjacent rows is provided along the lateral direction.

9. The secondary-sided arrangement of claim 6, wherein the at least one magnetically conducting element or an arrangement of magnetically conducting elements provides a recess to receive at least a section of the secondary winding structure.

10. A secondary-sided arrangement, comprising:
    at least one phase line;
    one secondary winding structure per phase line; and
    at least one magnetically conducting element or an arrangement of magnetically conducting elements;
    wherein at least one section of the at least one magnetically conducting element extends into the secondary winding structure or at least one subwinding structure of the secondary winding structure;
    wherein magnetically conducting elements of the arrangement of multiple magnetically conducting elements are arranged in a row, wherein at least two successive magnetically conducting elements are aligned with a lateral offset to one another.

11. The secondary-sided arrangement of claim 10, wherein the arrangement of magnetically conducting elements comprises multiple bar elements.

12. The secondary-sided arrangement of claim 10, wherein the arrangement of magnetically conducting elements comprises multiple rows of at least one magnetically conducting element, wherein a non-zero gap between two adjacent rows is provided along the lateral direction.

13. The secondary-sided arrangement of claim 10, wherein the at least one magnetically conducting element or the arrangement of magnetically conducting elements provides a recess to receive at least a section of a secondary winding structure.

* * * * *

UNITED STATES PATENT AND TRADEMARK OFFICE
CERTIFICATE OF CORRECTION

PATENT NO. : 11,348,724 B2
APPLICATION NO. : 16/930783
DATED : May 31, 2022
INVENTOR(S) : Wirth et al.

Page 1 of 1

It is certified that error appears in the above-identified patent and that said Letters Patent is hereby corrected as shown below:

In the Claims

Column 32, Line 47, delete "claied" and insert -- claimed --

Signed and Sealed this
Second Day of August, 2022

Katherine Kelly Vidal
*Director of the United States Patent and Trademark Office*